US011454793B2

(12) United States Patent
Matsumoto

(10) Patent No.: US 11,454,793 B2
(45) Date of Patent: Sep. 27, 2022

(54) ABERRATION CORRECTION METHOD AND OPTICAL DEVICE

(71) Applicant: HAMAMATSU PHOTONICS K.K., Hamamatsu (JP)

(72) Inventor: Naoya Matsumoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 387 days.

(21) Appl. No.: 16/604,312

(22) PCT Filed: Apr. 10, 2018

(86) PCT No.: PCT/JP2018/015080
§ 371 (c)(1),
(2) Date: Oct. 10, 2019

(87) PCT Pub. No.: WO2018/190339
PCT Pub. Date: Oct. 18, 2018

(65) Prior Publication Data
US 2020/0150423 A1 May 14, 2020

(30) Foreign Application Priority Data
Apr. 14, 2017 (JP) .............................. JP2017-080749

(51) Int. Cl.
*G02B 21/00* (2006.01)
*G01N 21/64* (2006.01)
(Continued)

(52) U.S. Cl.
CPC ..... *G02B 21/0076* (2013.01); *G01N 21/6458* (2013.01); *G02B 21/0032* (2013.01); *G02B 21/04* (2013.01); *G02B 27/0068* (2013.01)

(58) Field of Classification Search
CPC ........... G02B 21/0076; G02B 21/0032; G02B 21/04; G02B 27/0068; G02B 21/0072;
(Continued)

(56) References Cited

U.S. PATENT DOCUMENTS

2013/0181143 A1* 7/2013 Betzig ................ G02B 21/0032
250/459.1
2015/0293337 A1* 10/2015 Matsumoto ............ G02B 21/06
359/250
2017/0082597 A1 3/2017 Matsumoto et al.

FOREIGN PATENT DOCUMENTS

JP 2002-54909 A 2/2002
JP 2010-75997 A 4/2010
(Continued)

OTHER PUBLICATIONS

International Preliminary Report on Patentability dated Oct. 24, 2019 for PCT/JP2018/015080.
(Continued)

*Primary Examiner* — Mustak Choudhury
(74) *Attorney, Agent, or Firm* — Faegre Drinker Biddle & Reath LLP

(57) ABSTRACT

A microscope apparatus includes SLMs each having a modulation plane, an objective lens disposed on an optical path between the modulation plane and an object, and a computer for controlling the SLMs on the basis of a modulation pattern including a correction pattern for correcting aberration caused by a refractive index interface of the object. The computer determines a position of the correction pattern in the modulation pattern on the basis of inclination information of the refractive index interface with respect to a plane perpendicular to an optical axis of the objective lens.

16 Claims, 14 Drawing Sheets

(51) Int. Cl.
*G02B 21/04* (2006.01)
*G02B 27/00* (2006.01)

(58) Field of Classification Search
CPC ............. G02B 26/101; G02B 21/0056; G02B 21/367; G02B 21/361; G01N 21/6458; G02F 1/01
See application file for complete search history.

(56) References Cited

FOREIGN PATENT DOCUMENTS

| | | |
|---|---|---|
| JP | 2011-180290 A | 9/2011 |
| JP | 2014-521122 A | 8/2014 |
| JP | 2015-219502 A | 12/2015 |
| WO | WO-2013/010151 A1 | 1/2013 |

OTHER PUBLICATIONS

Naoya Matsumoto et al., "Correction of depth-induced spherical aberration for deep observation using two-photon excitation fluorescence microscopy with spatial light modulator," Biomedical Optics Express, 2015, pp. 2575-2587, vol. 6, No. 7.

\* cited by examiner

*Fig.13*
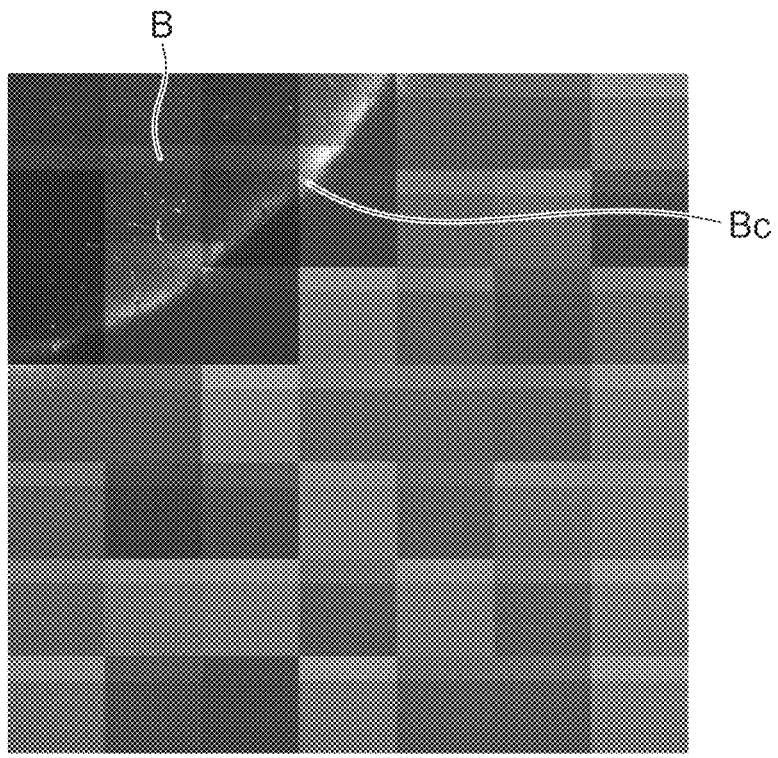
(a)
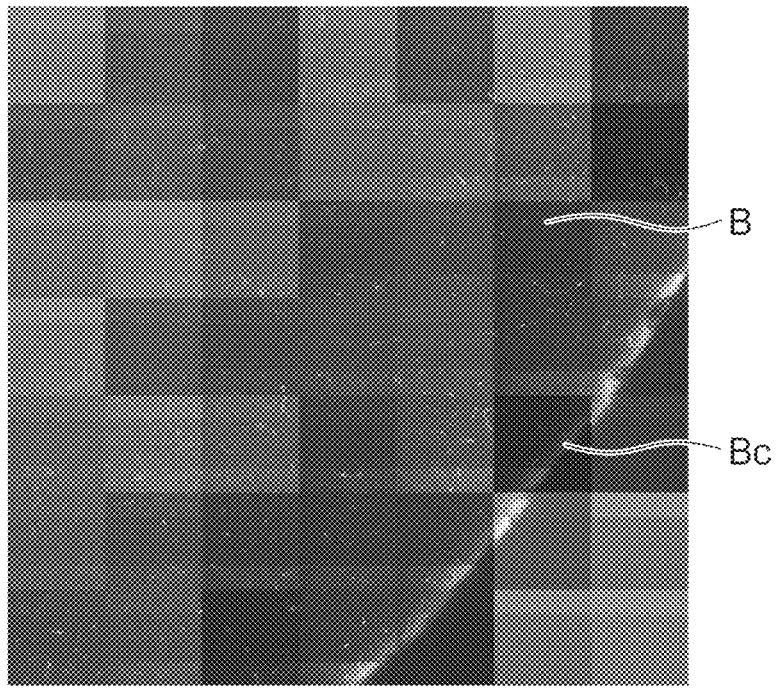
(b)

ABERRATION CORRECTION METHOD AND OPTICAL DEVICE

TECHNICAL FIELD

The present disclosure relates to an aberration correction method and an optical apparatus.

BACKGROUND ART

Patent Documents 1 and 2 disclose methods for reducing the influence of aberration and the like on a refractive index interface using a spatial light modulator. In the method described in Patent Document 1, aberration of laser light is corrected so that the focusing point of the laser light is located within an aberration range generated inside a medium. Further, in the method described in Patent Document 2, when n denotes a refractive index of a medium, d denotes a depth from an incident surface of the medium to a focal point of focusing means when assuming that the refractive index n of the medium is equal to a refractive index of an ambient medium of the focusing means, and Δs denotes a maximum value of longitudinal aberration generated by the medium, aberration of laser light is corrected so that the focusing point of the laser light is located within a range that is larger than n×d−Δs and smaller than n×d from the incident surface of the medium. Accordingly, the aberration of the laser light can be corrected so that the focusing point is located within the range in which the longitudinal aberration is present inside the medium when the aberration is not corrected.

Non Patent Document 1 describes a technique relating to a two-photon excitation fluorescence microscope. In the two-photon excitation fluorescence microscope, an aberration correction pattern is displayed on a spatial light modulator, and irradiation light to an observation object is modulated using the spatial light modulator to correct spherical aberration caused by the surface shape of the observation object.

CITATION LIST

Patent Literature

Patent Document 1: Japanese Patent Application Laid-Open Publication No. 2010-75997
Patent Document 2: Japanese Patent Application Laid-Open Publication No. 2011-180290

Non Patent Literature

Non Patent Document 1: Naoya Matsumoto, Takashi Inoue, Akiyuki Matsumoto, and Shigetoshi Okazaki, "Correction of depth-induced spherical aberration for deep observation using two-photon excitation fluorescence microscopy with spatial light modulator", Biomedical Optics Express, Vol. 6, No. 7, pp. 2575-2587, (2015)

SUMMARY OF INVENTION

Technical Problem

For example, in various optical apparatuses such as a laser processing apparatus and a microscope, in order to correct aberration (for example, spherical aberration) generated by a refractive index interface which is present on the surface of an object or inside the object, for example, irradiation light (or observation light) may be modulated using a spatial light modulator (SLM) having an aberration correction pattern. In such a case, when the refractive index interface of the object is perpendicular to the optical axis, the aberration correction pattern expands concentrically from the optical axis, and thus, a calculation for obtaining the pattern is relatively easy.

However, the refractive index interface of the object may be inclined with respect to the optical axis. In such a case, aberration other than spherical aberration is included, and thus, the aberration correction pattern calculation becomes complicated and requires a long time. In particular, for example, when irradiation or observation is performed while changing the relative distance between an object and a lens, such as when a three-dimensional image is obtained using a microscope, it is necessary to recalculate the aberration correction pattern every time the relative distance changes, and thus, the time required for operation becomes extremely long. Further, the aberration correction pattern calculation itself may become difficult.

An object of embodiments is to provide an aberration correction method and an optical apparatus capable of easily performing aberration correction within a short time even when a refractive index interface such as a surface of an object is inclined with respect to an optical axis.

Solution to Problem

An embodiment is an aberration correction method. The aberration correction method includes a coupling step of optically coupling a modulation plane of a spatial light modulator and an object through an objective lens; and a control step of controlling the spatial light modulator on the basis of a modulation pattern including a correction pattern for correcting aberration caused by a refractive index interface of the object. In the aberration correction method, a position of the correction pattern in the modulation pattern is set on the basis of inclination information of the refractive index interface of the object with respect to a plane perpendicular to an optical axis of the objective lens.

Further, an embodiment is an optical apparatus. The optical apparatus includes a spatial light modulator having a modulation plane; an objective lens disposed on an optical path between the modulation plane and an object; and a control unit for controlling the spatial light modulator on the basis of a modulation pattern including a correction pattern for correcting aberration caused by a refractive index interface of the object. In the optical apparatus, a position of the correction pattern in the modulation pattern is set on the basis of inclination information of the refractive index interface of the object with respect to a plane perpendicular to an optical axis of the objective lens.

The present inventor has found out that, when the refractive index interface of the object is inclined with respect to the optical axis of the objective lens, aberration can be appropriately corrected by setting the position of the correction pattern in the modulation pattern according to the inclination information such as an inclination angle. Accordingly, it is possible to easily perform aberration correction within a short time without performing a complicated calculation.

Another embodiment is an aberration correction method. The aberration correction method includes a coupling step of optically coupling a modulation plane of a spatial light modulator and an object through an objective lens; and a control step of controlling the spatial light modulator on the basis of a modulation pattern including a correction pattern for correcting aberration caused by a refractive index interface of the object. In the aberration correction method, the spatial light modulator and the objective lens are disposed on the basis of inclination information of the refractive index interface of the object with respect to a plane perpendicular to an optical axis of the objective lens.

Further, another embodiment is an optical apparatus. The optical apparatus includes a spatial light modulator having a modulation plane, and for modulating light on the basis of a modulation pattern including a correction pattern for correcting aberration caused by a refractive index interface of an object; an objective lens disposed on an optical path between the modulation plane and the object; a moving mechanism for moving at least one of the objective lens and the spatial light modulator in a direction intersecting with an optical axis of the objective lens; and a control unit for controlling the moving mechanism. In the optical apparatus, the control unit controls the moving mechanism on the basis of inclination information of the refractive index interface of the object with respect to a plane perpendicular to the optical axis of the objective lens.

The above findings of the present inventor do not necessarily require moving the correction pattern within the modulation plane of the spatial light modulator, and can also be achieved by moving the modulation plane itself of the spatial light modulator and/or the objective lens itself. Accordingly, it is possible to easily perform aberration correction within a short time without performing a complicated calculation.

Advantageous Effects of Invention

According to the aberration correction method and the optical apparatus of the embodiments, it is possible to easily perform aberration correction within a short time even when the refractive index interface of the object is inclined with respect to the optical axis.

BRIEF DESCRIPTION OF DRAWINGS

FIG. 13 includes (a), (b) mouse brain images obtained by pre-scan.

DESCRIPTION OF EMBODIMENTS

Hereinafter, embodiments of an aberration correction method and an optical apparatus will be described in detail with reference to the accompanying drawings. In the description of the drawings, the same elements will be denoted with the same reference symbols, and overlapping description will be omitted.

Figure 1:
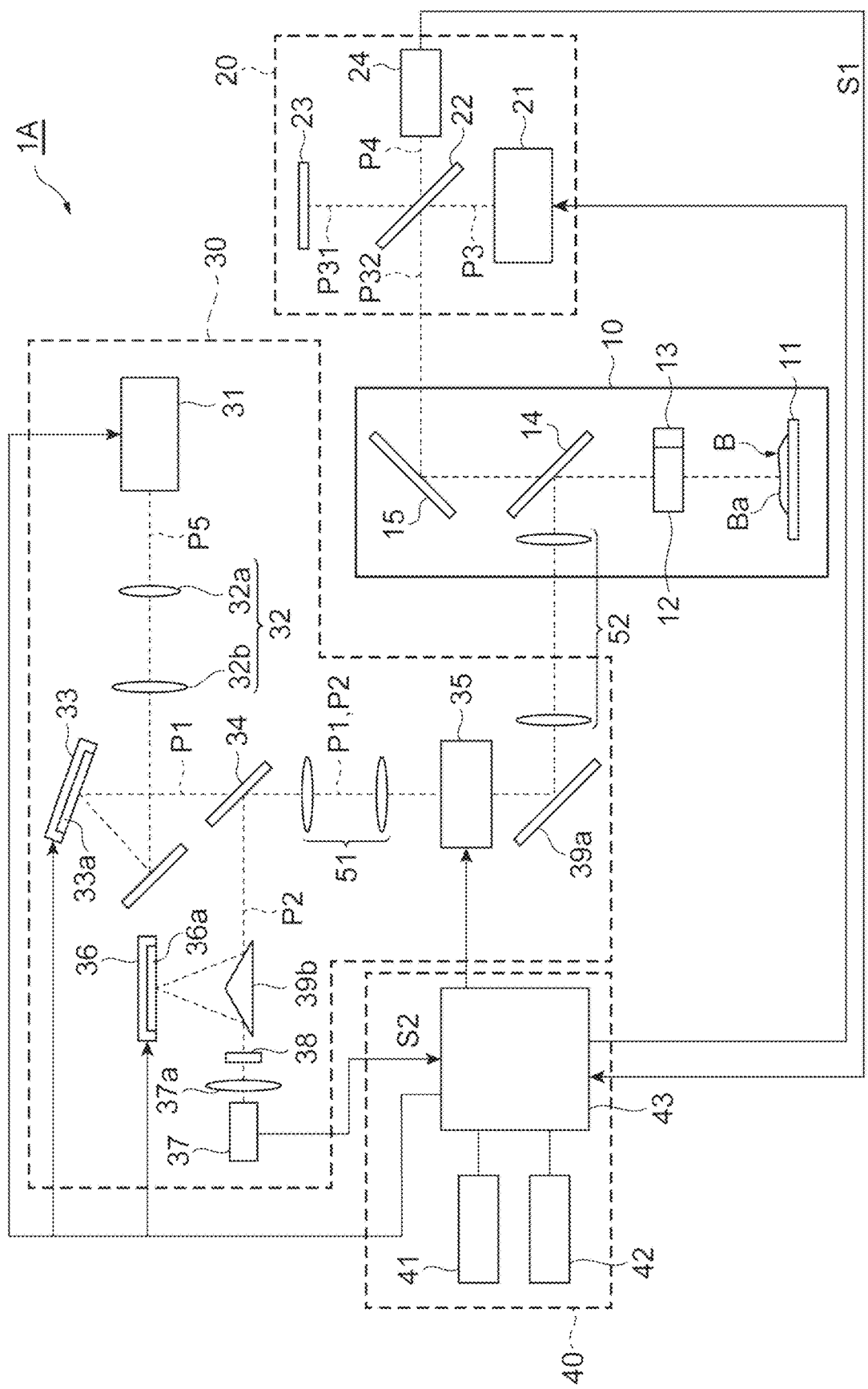
FIG. 1 is a diagram illustrating a configuration of a microscope apparatus as an optical apparatus according to an embodiment.

FIG. 1 is a diagram illustrating a configuration of a microscope apparatus 1A as an optical apparatus according to an embodiment. The microscope apparatus 1A is an apparatus for acquiring an enlarged image of an object B while irradiating the object B with light, and as illustrated in FIG. 1, the apparatus includes a microscope unit 10, an inclination measurement unit 20, an image acquisition unit 30, and a control unit 40.

The microscope unit 10 irradiates the object B with irradiation light P1 from the inclination measurement unit 20 and the image acquisition unit 30 described below, and outputs detection target light P2 from the object B respectively to the inclination measurement unit 20 and the image acquisition unit 30. The detection target light P2 is, for example, reflected light of the irradiation light P1, a harmonic of the irradiation light P1, or fluorescence excited by the irradiation light P1. The microscope unit 10 includes a sample stage (stage) 11, an objective lens 12, an objective lens moving mechanism 13, and a beam splitter 14.

The sample stage 11 is a plate-shaped member for supporting the object B (or a container for housing the object B). The sample stage 11 is, for example, made of glass. In the present embodiment, the object B is irradiated with the irradiation light P1 from the front face side of the sample stage 11. Further, the detection target light P2 from the object B is output to the front face side of the sample stage 11.

The objective lens 12 is disposed on an optical path of the irradiation light P1 between an SLM 33 described below and a surface Ba of the object B. Further, the objective lens 12 is disposed on an optical path of the detection target light P2 between an SLM 36 described below and the surface Ba of the object B. One face of the objective lens 12 is disposed facing the sample stage 11, and a focal point on the one face side of the objective lens 12 is located inside the object B. The objective lens 12 focuses the irradiation light P1 onto a point inside the object B. Further, the objective lens 12 receives part of the detection target light P2 emitted from the point inside the object B, and collimates the part. The objective lens 12 may be a dry objective lens, a water immersion objective lens, or a liquid immersion objective lens such as an oil immersion objective lens.

In addition, in the present embodiment, the common objective lens is used for the irradiation light P1 and the detection target light P2, however, an objective lens for the irradiation light P1 and an objective lens for the detection target light P2 may be separately provided. For example, an objective lens having a large pupil diameter may be used for the irradiation light P1 to locally focus light by aberration correction described below. Further, an objective lens having a large pupil may be used for the detection target light P2 to extract more light.

The objective lens moving mechanism 13 is a mechanism for moving the objective lens 12 in the optical axis direction of the irradiation light P1. The objective lens 12 is supported movably in the optical axis direction by the objective lens moving mechanism 13. The objective lens moving mechanism 13 may include, for example, a stepping motor or a piezo actuator.

The beam splitter 14 splits and combines an optical path between the beam splitter and the image acquisition unit 30 and an optical path between the beam splitter and the inclination measurement unit 20. Specifically, the beam splitter 14 reflects the irradiation light P1 arriving at the microscope unit 10 from the image acquisition unit 30 toward the objective lens 12. Further, the beam splitter 14 reflects the detection target light P2 collected by the objective lens 12 toward the image acquisition unit 30. On the other hand, the beam splitter 14 transmits light P32 from the inclination measurement unit 20 and reflected light of the light P32 reflected by the object B. The beam splitter 14 preferably includes, for example, a half mirror or a dichroic mirror. The microscope unit 10 may further include a reflective mirror 15 which changes the optical axis direction of the light P32.

The inclination measurement unit 20 is a measurement unit in the present embodiment, and measures an inclination angle of a refractive index interface of the object B with respect to a plane perpendicular to the optical axis of the objective lens 12. Hereinafter, a refractive index interface between the surface Ba of the object B and a surrounding medium will be described as an example of the refractive index interface of the object B, however, the refractive index interface of the object B is not limited thereto. For example, it may be a refractive index interface between the object B and the container for housing the object B or a refractive index interface in the internal structure of the object B. The surrounding medium is, for example, air or an immersion liquid.

The inclination measurement unit 20 may be, for example, an interference light measurement unit for measuring a surface shape of the object B using a Michelson interferometer. In this case, as illustrated in FIG. 1, the inclination measurement unit 20 includes a coherent light source 21, a beam splitter 22, a reference light mirror 23, and a detector 24.

The coherent light source 21 generates coherent light P3 for irradiating the object B. The coherent light source 21 preferably includes, for example, a semiconductor laser element. The beam splitter 22 splits the coherent light P3 from the coherent light source 21 into reference light P31 and the light P32 to the microscope unit 10. Further, the beam splitter 22 reflects the reference light P31 reflected by the reference light mirror 23 and transmits the reflected light of the light P32 from the surface of the object B to generate interference light P4 by combining these light beams. The interference light P4 enters the detector 24. In addition, the reference light mirror 23 may be movable in the optical axis direction of the reference light P31 or may be fixed. The detector 24 detects the interference light P4 combined by the beam splitter 22 and outputs a detection signal S1. The detector 24 includes, for example, a two-dimensional photodetector element such as a CCD image sensor and a CMOS image sensor.

In addition, the inclination measurement unit is not limited to the above configuration. For example, the inclination measurement unit may include a Mirau type or a Linnik type interference measurement system. Further, the inclination measurement unit may include a confocal reflectance microscope or may include a common path interferometer. According to such a microscope, it is possible to appropriately measure the inclination angle of the surface Ba of the object B using focusing information.

The image acquisition unit 30 detects the detection target light P2 from the object B and creates an enlarged image. In addition, although an example of a fluorescence optical system when the detection target light P2 is fluorescence from the object B will be described below, the detection target light P2 may be reflected light or a harmonic from the object B. The image acquisition unit 30 of the present embodiment includes a laser light source 31, a beam expander 32, the SLM 33, a dichroic mirror 34, an optical scanner 35, the SLM 36, a detector 37, and a filter 38.

The laser light source 31 is a light source for irradiating the object B with the irradiation light P1 through the objective lens 12. The laser light source 31 outputs light P5 which is a source of the irradiation light P1. The light P5 is, for example, laser light including an excitation wavelength of the object B. The laser light source 31 includes, for example, a semiconductor laser element. The beam expander 32 includes, for example, a plurality of lenses 32a, 32b disposed in sequence on the optical axis of the light P5, and adjusts the size of a cross-section perpendicular to the optical axis of the light P5.

The SLM 33 is a type of SLM which controls phase modulation in each of a plurality of pixels. The SLM 33 displays a modulation pattern (hologram) including a correction pattern for correcting aberration caused by a refractive index difference on the surface Ba of the object B, on a modulation plane 33a. The SLM 33 modulates the light P5 from the laser light source 31 to generate the light P1 for irradiating the object B. The objective lens 12 is disposed on the optical path of the light P1 between the modulation plane 33a of the SLM 33 and the surface Ba of the object B. In addition, the SLM 33 is not limited to the phase modulation type and may be an amplitude (intensity) modulation type. Further, the SLM 33 may be either a reflection type or a transmission type. In addition, details of the modulation pattern including the correction pattern will be described below.

The dichroic mirror 34 transmits one of the irradiation light P1 from the SLM 33 and the detection target light P2 from the microscope unit 10 and reflects the other one. In the example illustrated in FIG. 1, the dichroic mirror 34 transmits the irradiation light P1 and reflects the detection target light P2.

The optical scanner 35 moves the optical axis of the irradiation light P1 within a plane perpendicular to the optical axis of the irradiation light P1 to scan a focusing position of the irradiation light P1 on the object B. The optical scanner 35 includes, for example, a galvanometer mirror, a resonant mirror, or a polygon mirror. Further, the detection target light P2 from the object B is detected through the optical scanner 35. Accordingly, the optical axis of the irradiation light P1 and the optical axis of the detection target light P2 can be made coincide with each other.

The SLM 36 is a type of SLM which controls phase modulation in each of a plurality of pixels. The SLM 36 displays a modulation pattern including a correction pattern for correcting aberration caused by the refractive index difference on the surface Ba of the object B, on a modulation plane 36a. The SLM 36 modulates the detection target light P2 from the dichroic mirror 34. The objective lens 12 is disposed on the optical path of the detection target light P2 between the modulation plane 36a of the SLM 36 and the surface Ba of the object B.

The SLM 36 is not limited to a phase modulation type and may be an amplitude (intensity) modulation type. Further, the SLM 36 may be either a reflection type or a transmission type. When a pinhole is disposed on the preceding stage of the detector 37, a pattern for focusing the detection target light P2 onto the pinhole is preferably displayed on the modulation plane 36a in addition to the correction pattern. Accordingly, a confocal effect can be obtained. When the detection target light P2 such as fluorescence generated from the object B is detected using a multiphoton absorption effect such as two-photon absorption, the confocal effect can be obtained by superimposing a pattern for focusing the detection target light P2 onto the detector 37 on the correction pattern so as to be included in the modulation pattern. In addition, details of the modulation pattern including the correction pattern will be described below.

The detector 37 detects the light intensity of the detection target light P2 emitted from the object B through the objective lens 12 and outputs a detection signal S2. The detector 37 may be a point sensor such as a photomultiplier tube (PMT), a photodiode, and an avalanche photodiode. Further, the detector 37 may be an area image sensor such as a CCD image sensor, a CMOS image sensor, a multi-anode PMT, and a photodiode array. In addition, a focusing lens 37a may be disposed immediately before the detector 37.

The filter 38 is disposed on the optical axis between the dichroic mirror 34 and the detector 37. The filter 38 cuts the wavelength of the irradiation light P1 and the wavelength of fluorescence or the like unnecessary for observation, from light incident on the detector 37. In addition, the filter 38 may be disposed on either the preceding stage or the subsequent stage of the focusing lens 37a.

In addition, the image acquisition unit 30 of the present embodiment further includes a mirror 39a and a reflective member 39b in addition to the above configuration. The mirror 39a bends the optical axis of the irradiation light P1 and the detection target light P2 to optically couple the optical scanner 35 and the beam splitter 14 of the microscope unit 10. The reflective member 39b is a prism including two reflective surfaces and is disposed facing the SLM 36. The reflective member 39b reflects the detection target light P2 from the dichroic mirror 34 toward the SLM 36 on one of the reflective surfaces and reflects the detection target light P2 from the SLM 36 toward the detector 37 on the other reflective surface.

When the distance between the objective lens 12 and the SLM 33 is long, at least one 4f optical system may be provided on the optical axis of the irradiation light P1 and the detection target light P2. As an example, FIG. 1 illustrates two 4f optical systems 51 and 52. The 4f optical systems 51 and 52 have a role of transferring a wavefront of the irradiation light P1 generated in the SLM 33 to a back focal point of the objective lens 12. In addition, when the distance between the objective lens 12 and the SLM 33 is extremely short, the 4f optical system can be eliminated.

The control unit 40 is a control unit in the present embodiment. The control unit 40 controls the microscope unit 10, the inclination measurement unit 20, and the image acquisition unit 30.

For example, the control unit 40 controls the position of the objective lens 12 in the optical axis direction using the objective lens moving mechanism 13 in the microscope unit 10. Further, the control unit 40 moves the sample stage 11 which supports the object B in a direction intersecting with the optical axis direction. Further, the control unit 40 controls the coherent light source 21, the detector 24, and the reference light mirror 23 of the inclination measurement unit 20. Further, the control unit 40 controls the laser light source 31, the optical scanner 35, and the detector 37 of the image acquisition unit 30. In addition, the control unit 40 calculates modulation patterns to be displayed on the SLMs 33 and 36 and causes the SLMs 33 and 36 to display the modulation patterns.

The control unit 40 includes, for example, an input device 41 such as a mouse and a keyboard, a display device (display) 42, and a computer 43. The computer 43 is, for example, a personal computer, a microcomputer, a smart device, a cloud server, or the like.

Further, the control unit 40 constitutes a part of the measurement unit in the present embodiment. The control unit 40 inputs the detection signal S1 from the detector 24 of the inclination measurement unit 20 and acquires information relating to the inclination angle of the surface Ba of the object B on the basis of the detection signal S1 using a method using Fourier transform or a $\lambda/4$ phase shift interferometry. The control unit 40 creates modulation pattern data including the correction pattern for correcting aberration caused by the refractive index difference on the surface Ba of the object B on the basis of the acquired information. The modulation pattern data is supplied to the SLM 33 and the SLM 36. Further, the control unit 40 creates an enlarged image for the object B on the basis of the detection signal S2 from the detector 37 and information of a light irradiation position by the optical scanner 35. The created image is displayed on the display device 42.

Figure 2:
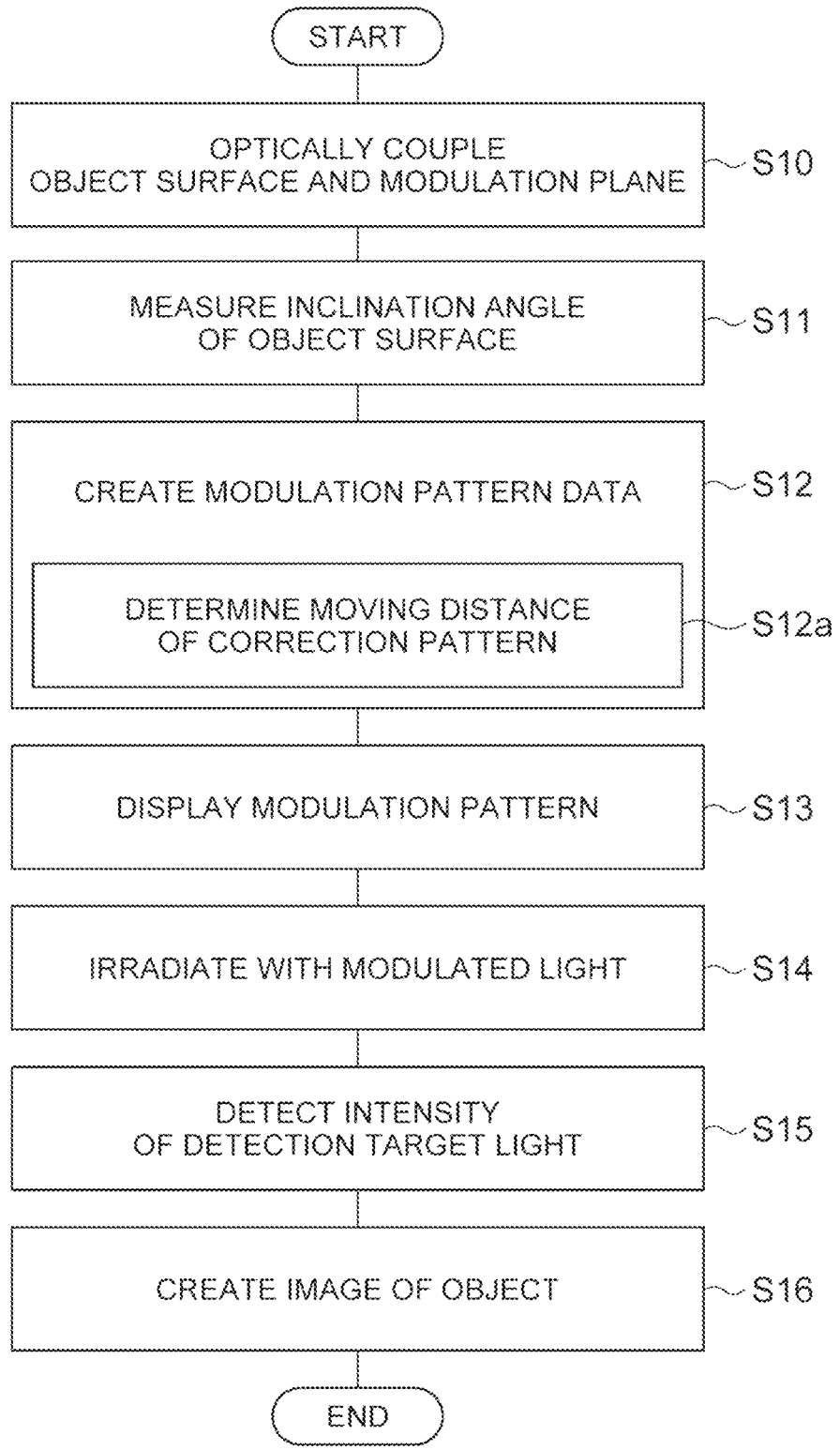
FIG. 2 is a flowchart illustrating an operation of the microscope apparatus.

FIG. 2 is a flowchart illustrating an operation of the microscope apparatus 1A described above. A light irradiation method and an observation method including an aberration correction method according to the present embodiment will be described with reference to FIG. 2.

First, the object B is placed on the sample stage 11 to optically couple the modulation planes 33a, 36a of the SLMs 33, 36 and the surface Ba of the object B through the objective lens 12 (a coupling step S10). Next, the light P3 is output from the light source 21 of the inclination measurement unit 20, and the interference light P4 of the reflected light from the surface of the object B and the reference light P31 is detected by the detector 24. Accordingly, an interference fringe on the surface Ba of the object B is observed. Further, the control unit 40 acquires the inclination angle of the surface Ba of the object B with respect to a plane perpendicular to the optical axis of the objective lens 12 on the basis of the interference fringe (a measurement step S11).

Subsequently, the control unit 40 creates modulation pattern data including a correction pattern for correcting aberration caused by the refractive index difference of the surface Ba of the object B on the basis of the inclination angle acquired in the measurement step S11 (a creation step S12). Then, the SLM 33 and the SLM 36 are controlled on the basis of the modulation pattern data, and modulation patterns based on the modulation pattern data are displayed on the SLMs 33 and 36 (a control step S13). Further, the light P5 output from the laser light source 31 is modulated by the SLM 33, and the object B is irradiated with the modulated irradiation light P1 through the objective lens 12 (an irradiation step S14).

Subsequently, the detector 37 detects the intensity of the detection target light P2 generated in the object B (a detection step S15). At this time, the detection target light P2 enters the detector 37 after being modulated by the SLM 36. In addition, in the present embodiment, the irradiation step S14 and the detection step S15 are repeatedly (or simultaneously and continuously) performed while the irradiation light P1 is scanned by the optical scanner 35. Then, the control unit 40 creates an enlarged image of the object B on the basis of detection information in the detection step S15 (an image creation step S16).

Here, details of the modulation pattern which is created in the creation step S12 and displayed on the modulation planes 33a, 36a of the SLMs 33, 36 will be described. In addition, in the following description, when the relationship between the surface Ba of the object B and the optical axis of the objective lens 12 is described, the "optical axis of the objective lens 12" means a straight line obtained by extending the optical axis of the objective lens 12 up to the surface Ba of the object B. Further, when the relationship between each of the modulation planes 33a, 36a of the SLMs 33, 36 and the optical axis of the objective lens 12 is described, the "optical axis of the objective lens 12" means a straight line (a straight line after bending when the optical axis is bent midway by a mirror or the like) obtained by extending the optical axis of the objective lens 12 up to each of the modulation planes 33a, 36a of the SLMs 33, 36. Generally, these straight lines coincide with a central axis of light beams of the irradiation light P1 and the detection target light P2.

Figure 3:
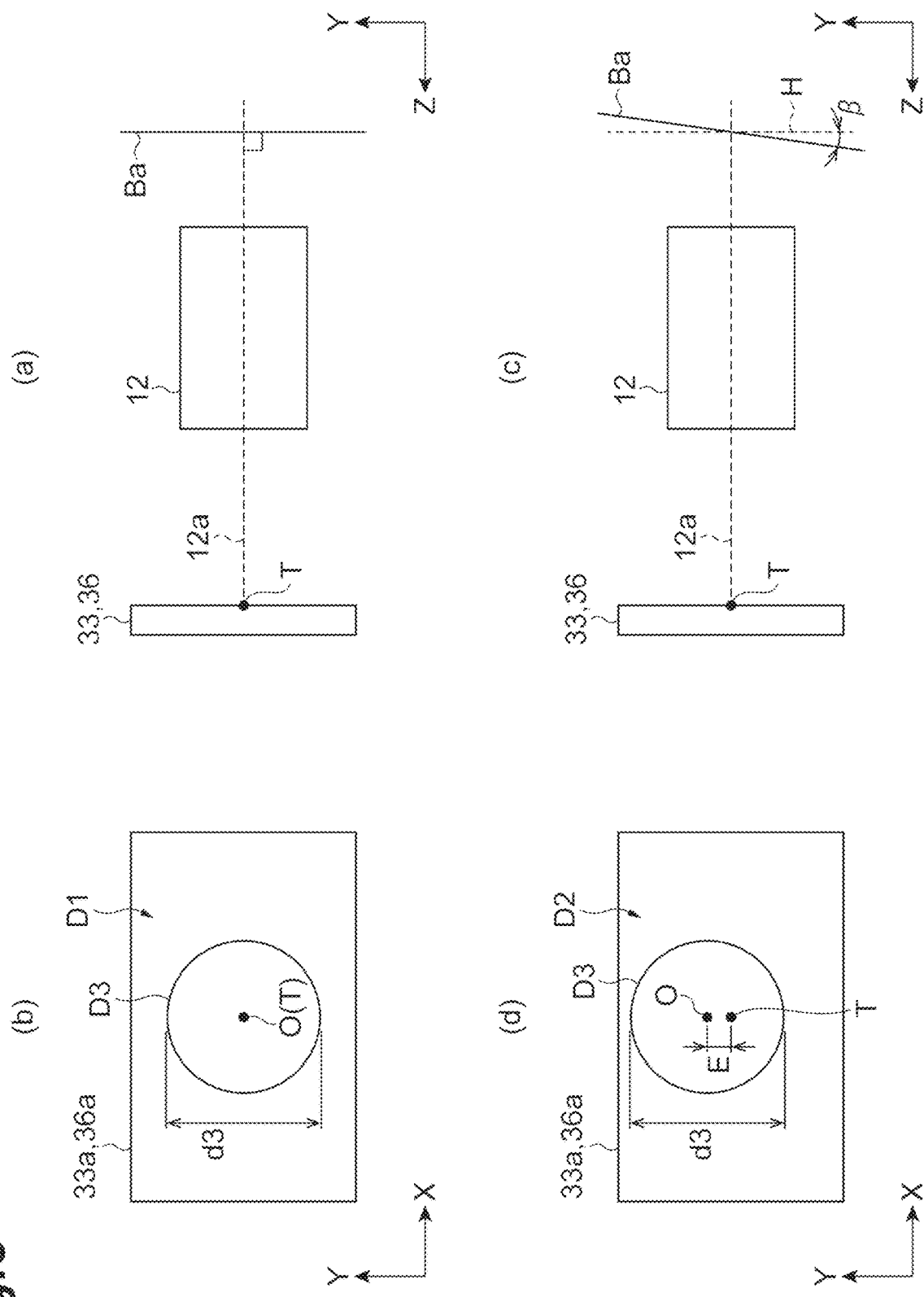
FIG. 3 includes (a)-(d) diagrams conceptually illustrating a modulation pattern created in a creation step.

FIG. 3 includes diagrams conceptually illustrating the modulation pattern created in the creation step S12. (a) in FIG. 3 illustrates a state in which the optical axis 12a of the objective lens 12 and the surface Ba of the object B are perpendicular to each other, and (b) in FIG. 3 illustrates a modulation pattern D1 which is displayed on each of the modulation planes 33a, 36a in the above case. In addition, in the drawings, an XYZ orthogonal coordinate system in which a direction along the optical axis 12a is defined as a Z direction is illustrated.

The modulation pattern D1 includes a correction pattern D3 for correcting aberration caused by the refractive index difference on the surface Ba of the object B. The correction pattern D3 is point symmetric with respect to the optical axis 12a of the objective lens 12, and for example, the pattern expands concentrically from a point T as a center where the optical axis 12a of the objective lens 12 intersects with each of the modulation planes 33a, 36a of the SLMs 33, 36. That is, a center O of the correction pattern D3 is located on the optical axis 12a of the objective lens 12.

Further, (c) in FIG. 3 illustrates a state in which the surface Ba of the object B is inclined by an angle β with respect to a plane H which is perpendicular to the optical axis 12a of the objective lens 12, and (d) in FIG. 3 illustrates a modulation pattern D2 which is displayed on each of the modulation planes 33a, 36a in the above case.

The modulation pattern D2 includes the correction pattern D3 described above. However, the center O of the correction pattern D3 is deviated by a distance E in the inclination direction of the surface Ba from the point T where the optical axis 12a of the objective lens 12 intersects with each of the modulation planes 33a, 36a of the SLMs 33, 36. The distance E is proportional to the inclination angle β of the surface Ba with respect to the plane H and appropriately obtained on the basis of the inclination angle β. In the present embodiment, in the creation step S12, the distance E is determined on the basis of the inclination angle β (a determination step S12a).

In addition, a diameter d3 of a display region of the correction pattern D3 on each of the modulation planes 33a, 36a may be larger than the pupil diameter of the objective lens 12. As illustrated in (d) in FIG. 3, when the correction pattern D3 is moved relative to the point T, the region where the correction pattern D3 is present is deviated with respect to the point T. Thus, when the display region of the correction pattern D3 is small, there is a possibility that part of light does not pass through the correction pattern D3, and aberration correction is not performed. When the diameter d3 of the display region of the correction pattern D3 is larger than the pupil diameter of the objective lens 12, such a possibility can be reduced.

Details of the method for determining the distance E on the basis of the inclination angle β will be described below. When a refractive index interface such as the surface Ba of the object B is present in the course of focusing the irradiation light P1 and in the course of emitting the detection target light P2, and the interface is perpendicular to the optical axis, aberration caused by the interface becomes substantially spherical aberration.

When the aberration is only spherical aberration, a distribution of aberration within the plane perpendicular to the optical axis of the objective lens 12 has a shape expanding concentrically from the optical axis as a center. The correction pattern displayed on the SLMs 33, 36 also has the similar shape, and the center of the pattern coincides with the optical axis of the objective lens 12. When (x, y) denotes a pixel position within each of the modulation planes 33a, 36a of the SLMs 33, 36, p denotes a pixel pitch, and T ($x_0$, $y_0$) denotes a position where the optical axis of the objective lens 12 intersects with each of the modulation planes 33a, 36a, a spherical aberration correction pattern ϕ in such a case is obtained, for example, by the following formula (1).

[Formula 1]

$$\overline{NA}\rho(x, y) = p * \sqrt{(x-x_0)^2 + (y-y_0)^2} \quad (1)$$

$$\Phi(r) = -\frac{2\pi d}{\lambda}\left(\alpha\sqrt{n_2^2 - (\overline{NA}\rho)^2} - \sqrt{n_1^2 - (\overline{NA}\rho)^2}\right)$$

Here, d denotes the distance between the refractive index interface (the surface Ba) and a focusing point on the optical axis, λ denotes the wavelength of light, $n_1$ denotes the refractive index of the surrounding medium, $n_2$ denotes the refractive index of the object B, NA denotes the numerical aperture of the objective lens 12, and α denotes a defocus parameter which moves an actual focusing position of light beams back and forth on the optical axis.

When the spherical aberration correction pattern ϕ is displayed on the SLM 33, the light P5 which is output as a plane wave from the laser light source 31 is modulated by the SLM 33. The modulated light P1 is focused onto a point having a predetermined depth in the object B while being diffracted on the surface Ba of the object B.

Figure 4:
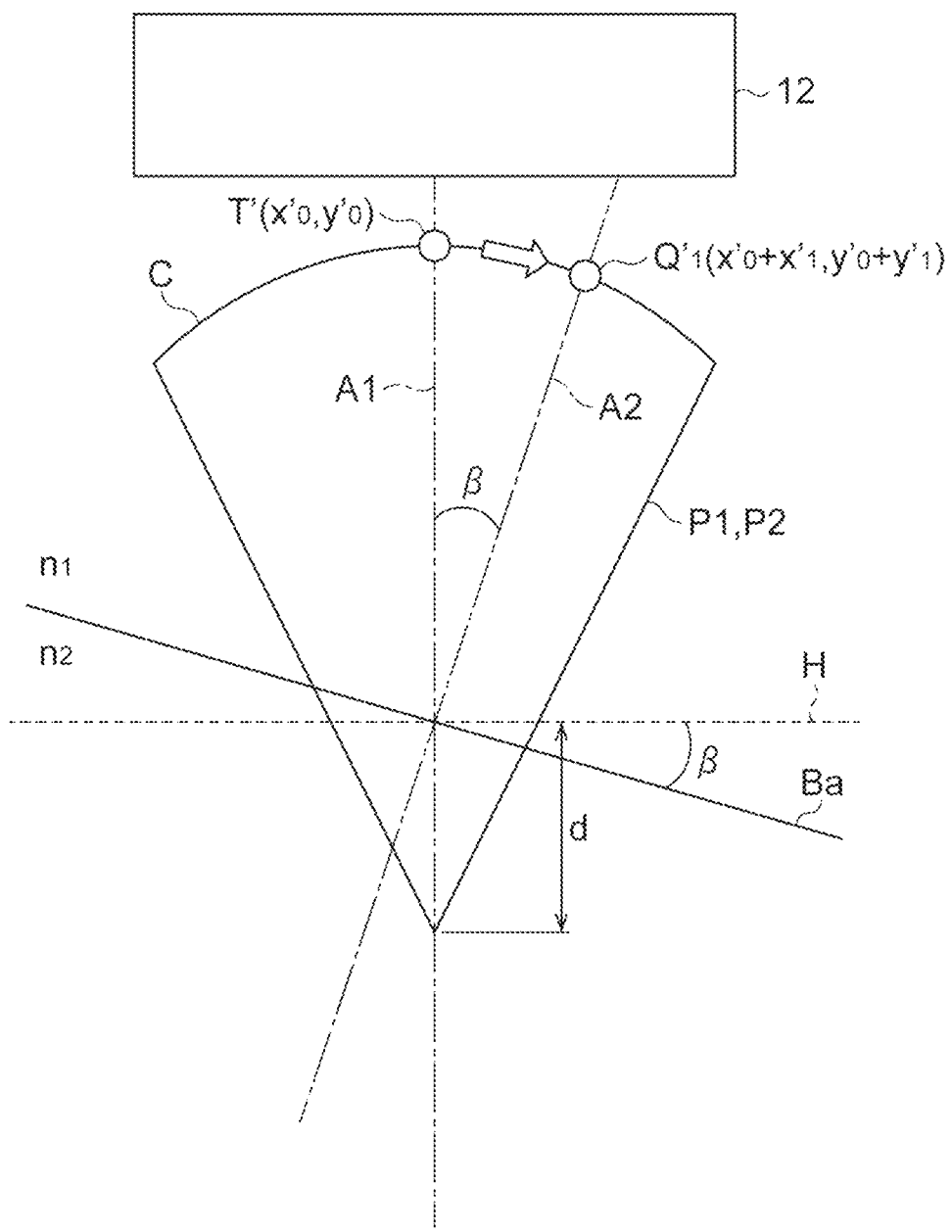
FIG. 4 is a schematic diagram illustrating a state in which a refractive index interface is inclined with respect to a plane perpendicular to an optical axis of an objective lens.

FIG. 4 is a schematic diagram illustrating a state in which the refractive index interface Ba is inclined with respect to the plane H which is perpendicular to the optical axis A1 of the objective lens 12. In addition, the position on the wavefront C of the light P1 corresponding to the pixel position (x, y) within each of the modulation planes 33a, 36a of the SLMs 33, 36 is defined as (x', y'). That is, the position T' on the wavefront C of the light P1 corresponding to the position T ($x_0$, $y_0$) where the optical axis of the objective lens 12 intersects with each of the modulation planes 33a, 36a is ($x'_0$, $y'_0$). The inclination angle of the refractive index interface Ba with respect to the plane H is β. At this time, a straight line perpendicular to the refractive index interface Ba serves as a new optical axis A2, and an intersection point $Q'_1$ ($x'_0+x'_1$, $y'_0+y'_1$) between the optical axis A2 and the wavefront (paraboloid) C of the light P1 output from the objective lens 12 (or the light P2 incident on the objective lens 12) serves as a central axis of a new aberration correction pattern. That is, the aberration correction pattern φ when the refractive index interface Ba is inclined is obtained by the following formula (2).

[Formula 2]

$$\overline{NA}\rho_1(x, y) = p * \sqrt{(x-(x_0+x_1))^2 + (y-(y_0+y_1))^2} \quad (2)$$

$$\Phi(r) = -\frac{2\pi}{\lambda}d\cos\beta\left(\alpha\sqrt{n_2^2 - (\overline{NA}\rho_1)^2} - \sqrt{n_1^2 - (\overline{NA}\rho_1)^2}\right)$$

Further, as described below, it is possible to easily obtain how many pixels the center of the new correction pattern should be moved with respect to the original correction pattern (the correction pattern when the refractive index interface Ba is perpendicular to the optical axis A1 of the objective lens 12) on the basis of an inclination azimuth angle α and the inclination angle β with respect to the plane H, a numerical aperture NA and a focal length f of the objective lens 12, the pixel pitch p of the SLMs 33, 36, an imaging magnification M of the objective lens 12 with respect to the SLMs 33, 36, and the refractive index $n_1$ of the surrounding medium.

First, in the measurement step S11, the inclination azimuth angle α and the inclination angle β are measured on the basis of the surface shape of the object B obtained by the inclination measurement unit 20. In an example, the obtained surface shape is approximated by a polynomial, and the inclination azimuth angle α and the inclination angle β are derived from the first-order term (ax+by, a and b are coefficients) of the obtained polynomial. In addition, the derivation of the inclination azimuth angle α and the inclination angle β is not limited to polynomial approximation. For example, it may be approximation other than polynomial approximation or interpolation such as spline interpolation.

Next, in the creation step S12, a moving distance (inclination information) of the aberration coercion pattern for reducing the influence of the inclination angle β on aberration correction based on the position of the aberration correction pattern when the surface Ba of the object B is perpendicular to the optical axis of the objective lens 12 is determined (the determination step S12a). The moving distance is appropriately obtained from the numerical aperture NA, the focal length f, and the imaging magnification M of the objective lens 12 as described below.

First, when θmax denotes a maximum value of an angle between a light beam arriving at the object B from the objective lens 12 or a light beam entering the objective lens 12 from the object B and the optical axis of the objective lens 12, θmax is obtained by the following formula (3) on the basis of the numerical aperture NA of the objective lens 12 and the refractive index $n_1$ of the surrounding medium.

$$\theta\max = a\sin(NA/n_1) \quad (3)$$

Further, a radius L1 of the pupil of the objective lens 12 is obtained by the following formula (4) on the basis of the numerical aperture NA and the focal length f of the objective lens 12.

$$L1 = NA \cdot f \quad (4)$$

Further, a radius L2 of light on the SLMs 33, 36 is obtained by the following formula (5) on the basis of the imaging magnification M of the objective lens 12 with respect to the SLMs 33, 36 (the objective lens 12 and the SLMs 33, 36 have a magnifying imaging relationship of M:1 (the light diameter on the SLMs 33, 36 side is smaller than the light diameter on the objective lens 12 side)).

$$L2 = L1/M \quad (5)$$

Here, when p denotes the pixel pitch of the modulation planes 33a, 36a, the number of pixels R of the SLMs 33, 36 included in the radius L2 is obtained by the following formula (6).

$$R = L2/p \quad (6)$$

From the above formula (3) and formula (6), the number of pixels r per an angle of 1° between the optical axis of the objective lens 12 and the light beam is obtained by the following formula (7).

$$r = R/\theta\max = (NA \cdot f)/(M \cdot p) \quad (7)$$

The moving distance (the number of pixels) of the aberration correction pattern is obtained by the product of the inclination angle β and the number of pixels r. In an example, an inclination angle component βx in the x axis direction and an inclination angle component βy in the y axis direction are calculated on the basis of the inclination azimuth angle α and the inclination angle β. A moving distance (the number of pixels) $x_1$ of the aberration correction pattern in the x axis direction and a moving distance (the number of pixels) $y_1$ in the y axis direction are respectively obtained by the following formulas (8), (9).

$$x_1 = \beta x \cdot r \quad (8)$$

$$y_1 = \beta y \cdot r \quad (9)$$

The aberration correction pattern that should be displayed on the SLMs 33, 36 is derived by applying these results to the formula (2).

Effects obtained by the microscope apparatus 1A and the aberration correction method of the present embodiment described above will be described.

As described above, the present inventor has found out that, when the surface Ba of the object B is inclined with respect to the optical axis 12a of the objective lens 12, aberration can be appropriately corrected by moving the correction pattern D3 for the case in which these are substantially perpendicular to each other, by a distance according to the inclination angle β in the inclination direction. That is, in the present embodiment, the modulation pattern D2 including a pattern obtained by moving the correction pattern D3, which is used when the optical axis 12a of the objective lens 12 and the surface Ba of the object B are substantially perpendicular to each other, within the modulation planes 33a, 36a is displayed on the modulation planes 33a, 36a. Further, the moving distance of the correction pattern D3 is determined on the basis of the inclination angle β of the surface Ba of the object B. Accordingly, it is possible to easily perform aberration correction within a short time without performing a complicated calculation.

Figure 5:
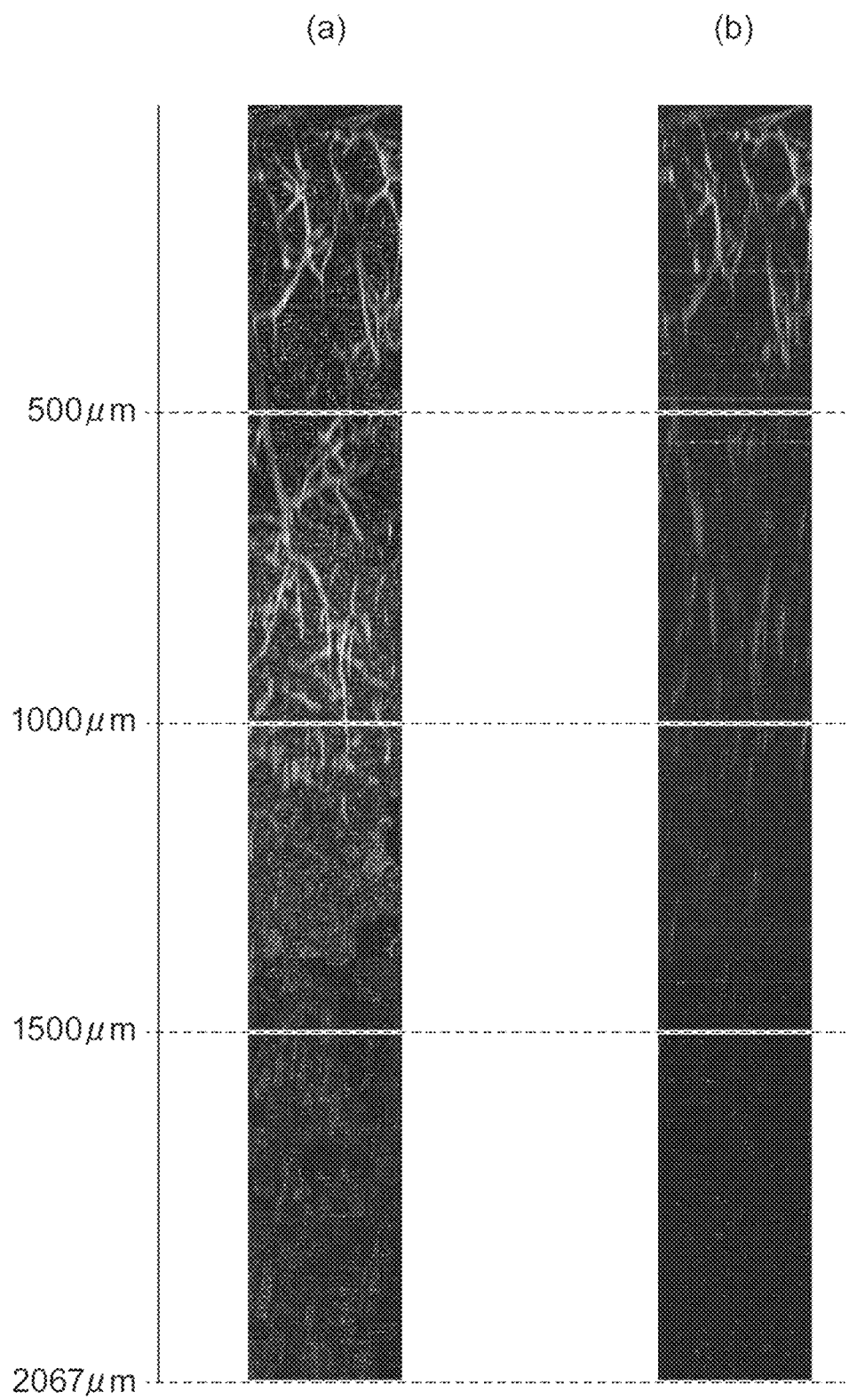
FIG. 5 includes (a), (b) images representing effects according to the embodiment, and illustrating a state of a blood vessel when an inside of a biological sample is observed as an object using a dry objective lens as an objective lens.

(a) in FIG. 5 and (b) in FIG. 5 are images representing the effects by the present embodiment and illustrate a state of a blood vessel when the inside of a biological sample is observed as the object B using a dry objective lens as the objective lens 12. The vertical axis in the drawings represents the depth from the surface of the biological sample. (a) in FIG. 5 is an image which is obtained by applying the aberration correction method of the present embodiment, and (b) in FIG. 5 is an image which is obtained without performing aberration correction.

As illustrated in (b) in FIG. 5, when no aberration correction is performed, the blood vessel looks blurred by the influence of aberration when the depth exceeds 500 μm. On the other hand, as illustrated in (a) in FIG. 5, when the aberration correction method of the present embodiment is applied, the blood vessel is clearly visible up to the range exceeding the depth of 1000 μm. In this manner, according to the present embodiment, even when the objective lens 12 is a dry objective lens, and aberration caused by the surface Ba of the object B is large, it is possible to appropriately correct the aberration and obtain an image which is clear up to a deeper part. Further, when the objective lens 12 is a dry objective lens or a liquid immersion objective lens, non-contact and less-invasive simple measurement can be performed.

In addition, each of the SLMs 33, 36 in the present embodiment may be an SLM of a type which performs phase modulation in each of a plurality of pixels, and for example, the SLM may be a liquid crystal on silicon (LCOS) type SLM, a deformable mirror, or the like. The deformable mirror may be either a membrane type or a segment type. The LCOS type SLM has a larger number of pixels than the deformable mirror, and is capable of correcting aberration with high accuracy. Further, the deformable mirror is capable of operating at a higher speed than the LCOS type SLM and capable of reducing the operating time.

The microscope apparatus 1A of the present embodiment may be a laser scanning two-photon excitation fluorescence microscope (TPFLM). In the TPFLM, fluorescence is generated only in a part where the photon density becomes extremely high by a two-photon absorption process (a part where excitation light is focused by the objective lens 12). Further, near-infrared light is used as the excitation light, and the excitation light is less absorbed and scattered by a living body than visible light. Local generation of fluorescence and small absorption and scattering are suitable for observation of a deep part of a biological sample. Further, when the deep part of a biological sample is observed, the aberration correction method of the present embodiment that is capable of easily performing aberration correction within a short time is extremely useful. According to the aberration correction method of the present embodiment, it is possible to improve the resolution in the deep part of a biological sample and easily observe a biological sample at a depth that has been difficult to observe by a conventional TPFLM.

EXAMPLE

An example of the above embodiment will be described. In the present example, a model sample was prepared as the object B by containing spherical fluorescent beads each having a particle diameter of 3 μm in an epoxy resin. Further, the surface of the model sample was inclined by 8° from a plane perpendicular to the optical axis 12a of the objective lens 12 using a goniometer and observation was performed.

In order to obtain a three-dimensional bead distribution, excitation light was scanned by a biaxial galvanoscanner within the plane perpendicular to the optical axis 12a of the objective lens 12, and fluorescence generated in a focusing point position was detected by a detector such as a PMT to obtain a two-dimensional image. Then, the above operation was repeatedly performed while moving the objective lens 12 or the sample stage 11 in the optical axis direction to obtain a plurality of images having different depths. At this time, the distance between the objective lens 12 and the sample stage 11 was changed from 600 μm to 800 μm. Further, these images were reconstructed to obtain a three-dimensional image. In addition, a dry objective lens (×20 magnification, NA=0.7) was used as the objective lens 12, and a surrounding medium of the model sample was air.

Figure 6:
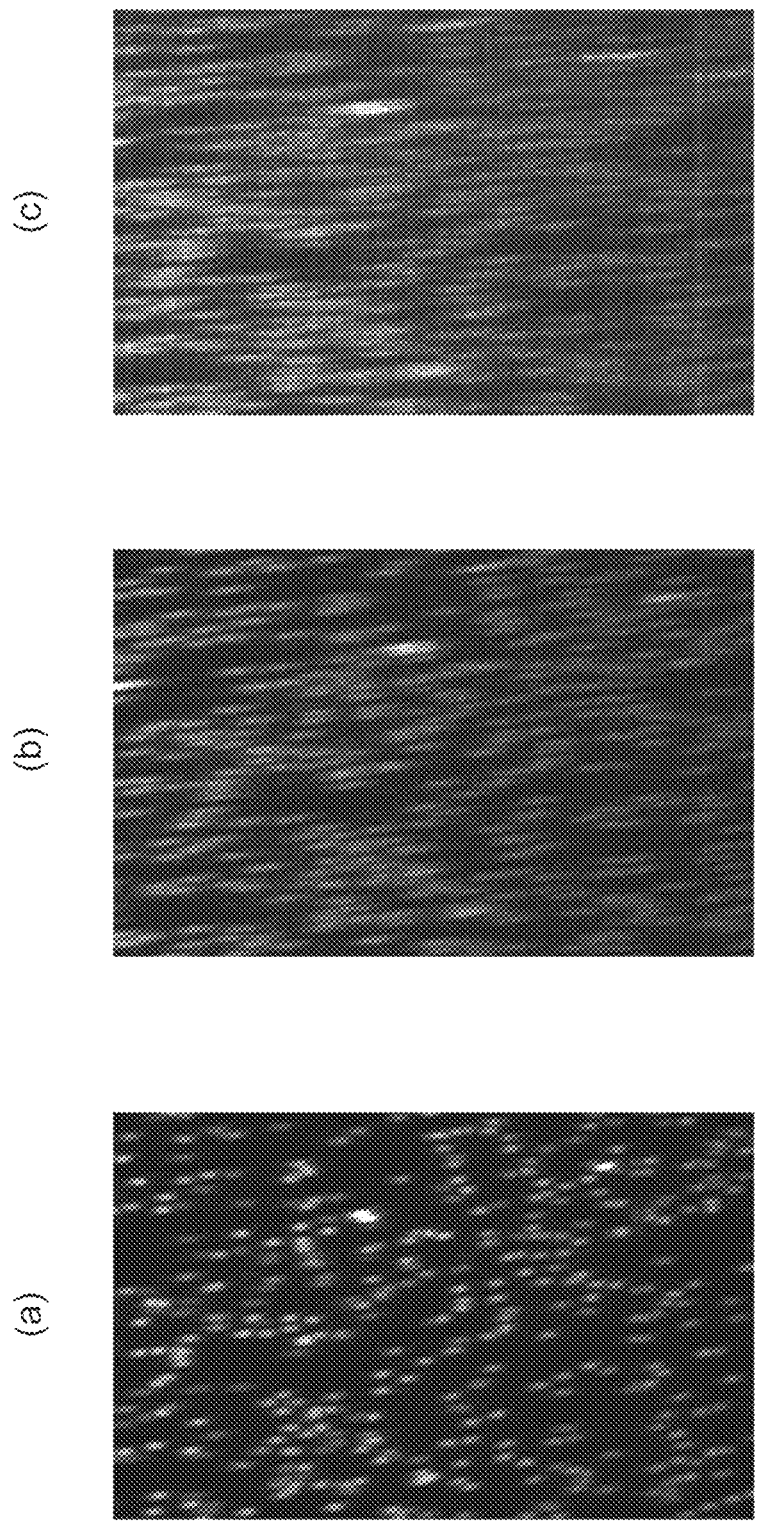
FIG. 6 includes (a)-(c) two-dimensional images which are obtained by cutting a three-dimensional image obtained in an example in a depth direction.

(a) in FIG. 6 to (c) in FIG. 6 are two-dimensional images obtained by cutting the three-dimensional image obtained in the present example in the depth direction. (a) in FIG. 6 is an image which is obtained when the aberration correction method of the above embodiment is applied, (b) in FIG. 6 is an image which is obtained without performing aberration correction (that is, by applying conventional parallel light having a wavefront perpendicular to the optical axis), and (c) in FIG. 6 is an image which is obtained without moving the correction pattern (refer to (a) in FIG. 3). In addition, in (a) in FIG. 6, the moving distance (the number of pixels) is 65 pixels. In the present example, since the surrounding medium is air, there is a refractive index difference between the surrounding medium and the model sample (epoxy resin). Thus, aberration is generated on the surface of the model sample. Further, since the surface of the model sample is inclined, aberration other than spherical aberration is also generated.

Referring to (b) in FIG. 6, the outlines of the fluorescent beads in the image extend in the depth direction by the influence of the above aberration. Further, when the correction pattern is not moved ((c) in FIG. 6), the maximum fluorescence intensity of the fluorescent beads is 0.4 times the intensity obtained when no aberration correction is performed ((b) in FIG. 6), and the image is more unclear than the image obtained when no aberration correction is performed. This is because another aberration (for example, astigmatism) is left in the case of the correction pattern that corrects only spherical aberration, and the other aberration becomes large due to an inappropriate wavefront.

On the other hand, referring to (a) in FIG. 6, when the aberration correction method of the above embodiment is applied, since aberration other than spherical aberration is also excellently corrected, it can be seen that the outline shape of each of the fluorescent beads in the image is close to a spherical shape and obviously improved. Further, the maximum fluorescence intensity of the fluorescent beads is 6.5 times the intensity obtained when no aberration correction is performed ((b) in FIG. 6) and remarkably bright. That is, the present example shows that, when the surface Ba of the object B is inclined with respect to the optical axis 12a, aberration can be accurately corrected by applying the aberration correction method of the above embodiment.

First Modification

Figure 7:
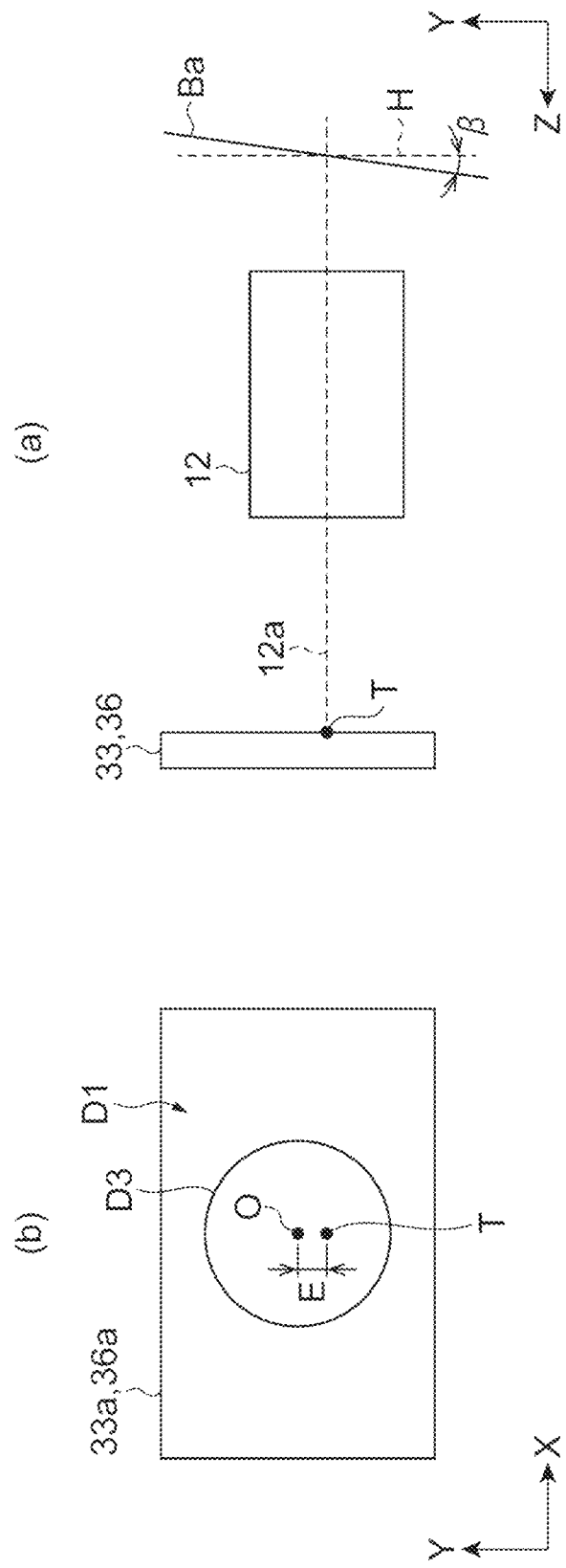
FIG. 7 includes (a), (b) diagrams conceptually illustrating a modification.

FIG. 7 includes diagrams conceptually illustrating a modification of the above embodiment. In the above embodiment, the SLM which controls modulation in each of a plurality of pixels is described as the SLMs 33, 36, however, the SLMs 33, 36 are not limited thereto, and may, for example, be an SLM including a modulation pattern fixed on the modulation planes 33a, 36a. In this case, as illustrated in (a) in FIG. 7 and (b) in FIG. 7, each of the modulation planes 33a, 36a itself having the aberration correction pattern D3, which is used when the optical axis 12a of the objective lens 12 and the surface Ba of the object B are substantially perpendicular to each other, is moved by the distance E relative to the optical axis 12a of the objective lens 12 in the direction intersecting with the optical axis 12a. Further, the moving distance E is determined on the basis of the inclination angle β of the surface Ba with respect to the plane H.

According to such a method, it is possible to easily perform aberration correction within a short time without performing a complicated calculation in a manner similar to the above embodiment. In addition, in this case, the formulas (8) and (9) described above are respectively replaced with the following formulas (10) and (11).

$$x_1 = \beta x \cdot L2/\theta max \quad (10)$$

$$y_1 = \beta y \cdot L2/\theta max \quad (11)$$

Further, each of the modulation planes 33a, 36a is preferably moved by $x_1$ in the x axis direction and by $y_1$ in the y axis direction.

Further, such a method can be applied also to the SLM which controls modulation in each of a plurality of pixels. First, the moving distance E is determined on the basis of the inclination angle β of the surface Ba with respect to the plane H. Further, the correction pattern D3 is displayed on each of the SLMs 33, 36 so that the center O of the correction pattern D3 is located on the optical axis 12a of the objective lens 12, and each of the SLMs 33, 36 itself is moved by the distance E relative to the optical axis 12a. Such a method is also capable of obtaining effects similar to the effects of the above embodiment.

Figure 8:
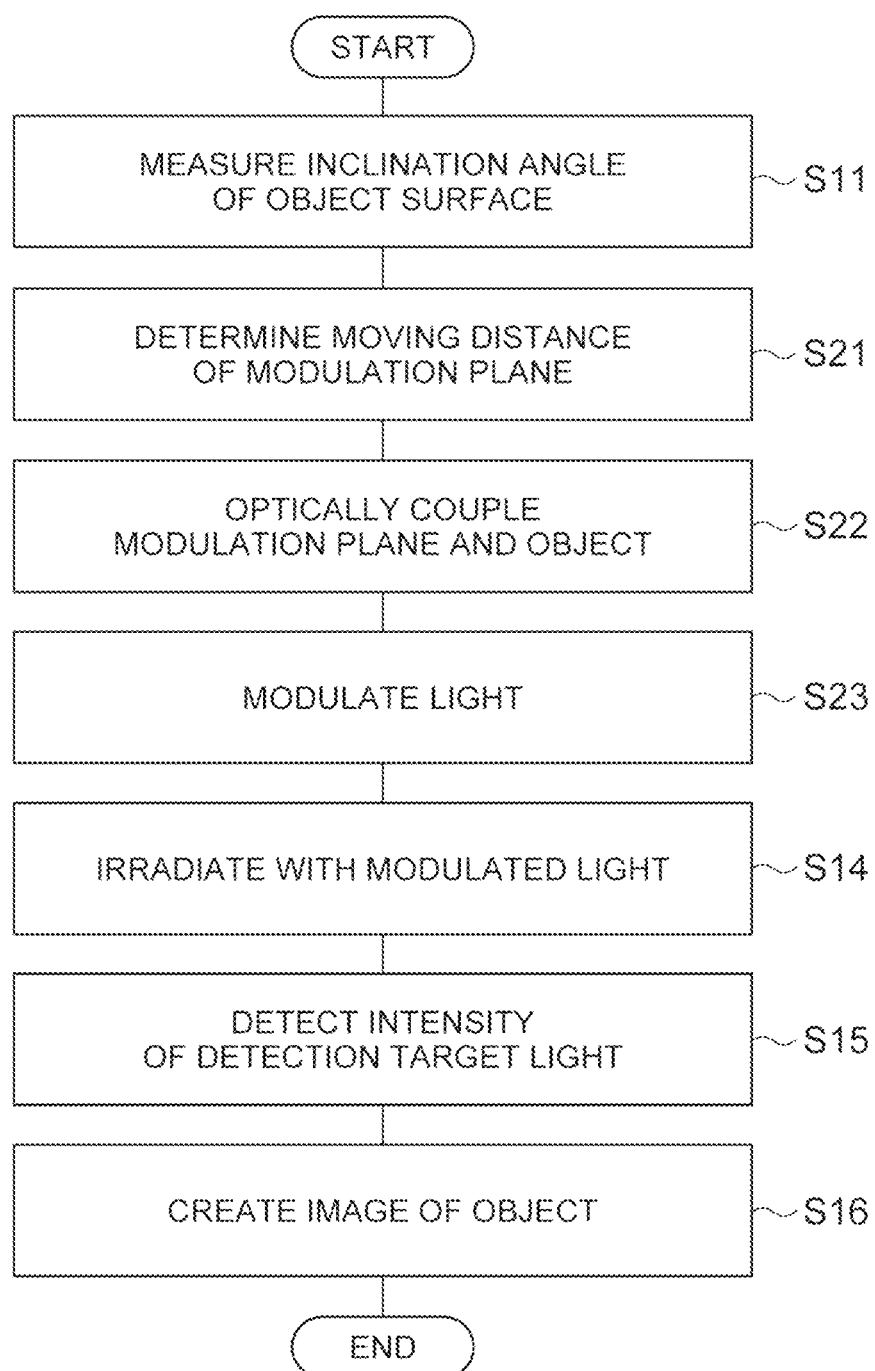
FIG. 8 is a flowchart illustrating an aberration correction method of a first modification.

FIG. 8 is a flowchart illustrating the aberration correction method of the present modification. As illustrated in FIG. 8, in the present modification, first, the inclination angle of the surface Ba of the object B with respect to the plane perpendicular to the optical axis of the objective lens 12 is acquired (a measurement step S11). Next, in a determination step S21, the moving distance E of the modulation planes 33a, 36a is determined on the basis of the inclination angle β of the surface Ba with respect to the plane H. Further, in a coupling step S22, each of the modulation planes 33a, 36a including the aberration correction pattern D3 is moved by the distance E relative to the optical axis 12a of the objective lens 12 in the direction intersecting with the optical axis 12a. In this state, the object B is placed on the sample stage 11 to optically couple the modulation planes 33a, 36a of the SLMs 33, 36 and the surface Ba of the object B through the objective lens 12. Then, the light P5 output from the laser light source 31 is modulated by the SLM 33 (a modulation step S23). Further, the object B is irradiated with the modulated irradiation light P1 through the objective lens 12 (an irradiation step S14). Thereafter, a detection step S15 and an image creation step S16 are performed in a manner similar to the above embodiment.

Figure 9:
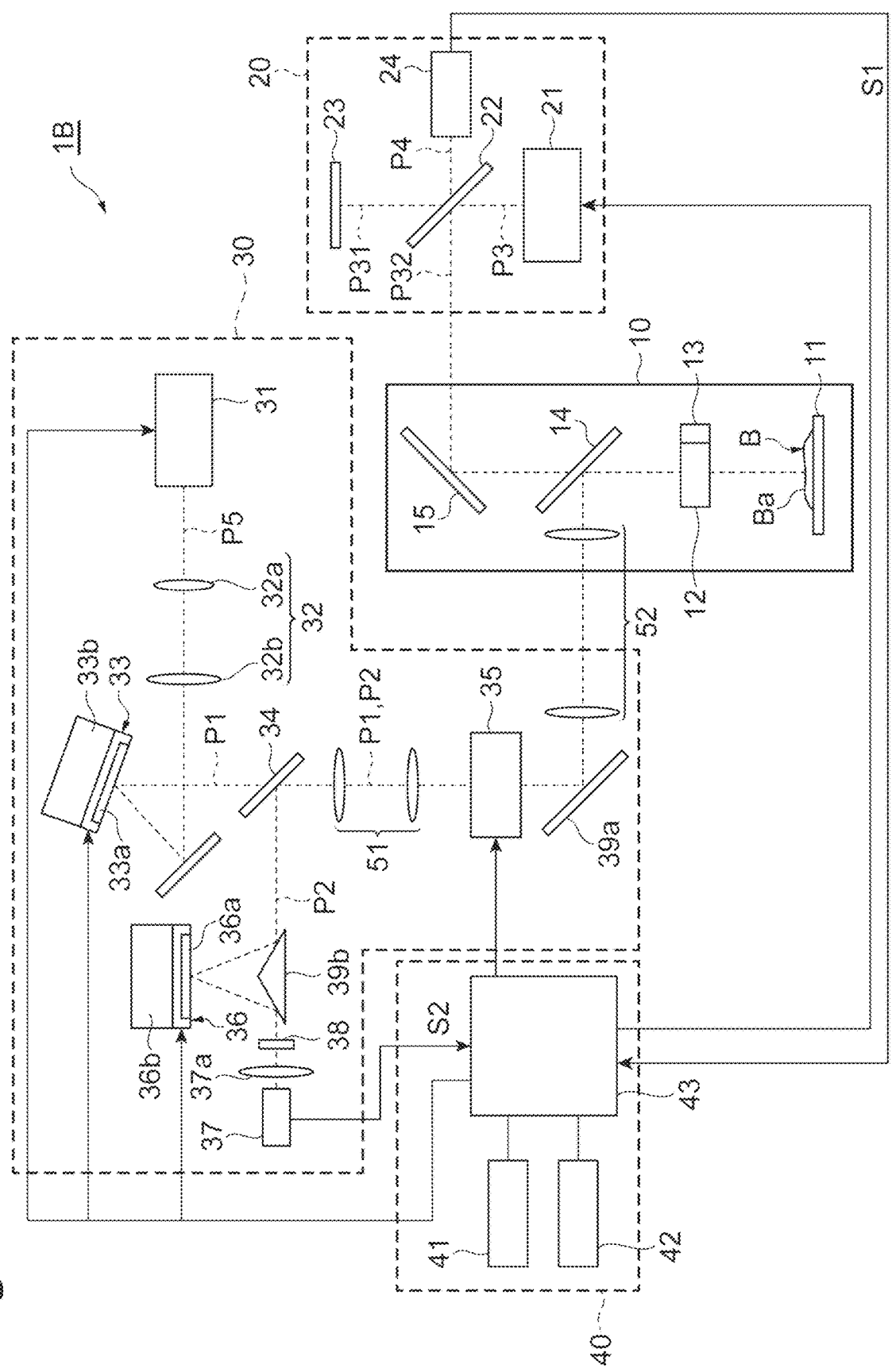
FIG. 9 is a diagram illustrating a configuration of a microscope apparatus capable of implementing an aberration correction method of a modification.

FIG. 9 is a diagram illustrating a configuration of a microscope apparatus 1B which is capable of implementing the aberration correction method of the present modification. The microscope apparatus 1B further includes moving mechanisms 33b, 36b in addition to the configuration of the microscope apparatus 1A illustrated in FIG. 1. The moving mechanism 33b supports the SLM 33 and moves the modulation plane 33a relative to the optical axis 12a of the objective lens 12 in the direction intersecting with the optical axis 12a. Similarly, the moving mechanism 36b supports the SLM 36 and moves the modulation plane 36a relative to the optical axis 12a of the objective lens 12 in the direction intersecting with the optical axis 12a.

The moving mechanisms 33b, 36b are controlled by the computer 43 of the control unit 40. The computer 43 determines the moving distance of the modulation planes 33a, 36a on the basis of the inclination angle β of the surface Ba with respect to the plane H. According to the microscope apparatus 1B having such a configuration, it is possible to easily perform aberration correction within a short time without performing a complicated calculation in a manner similar to the above embodiment. In addition, the microscope apparatus 1B may include a mechanism for moving the objective lens 12 in the direction intersecting with the optical axis 12a instead of moving the SLMs 33, 36 or in addition to moving the SLMs 33, 36.

Second Modification

The above embodiment describes, as an example, the method that approximates the surface shape of the object B by a polynomial and derives the inclination azimuth angle α and the inclination angle β from the first-order term of the obtained polynomial (in other words, the method that approximates the surface Ba of the object B to a single flat surface). Alternatively, for example, the optical axis 12a of the objective lens 12 may be divided into a plurality of regions, and the moving distance of the correction pattern D3 corresponding to each of the regions may be determined on the basis of the inclination angle β of each of the regions.

Figure 10:
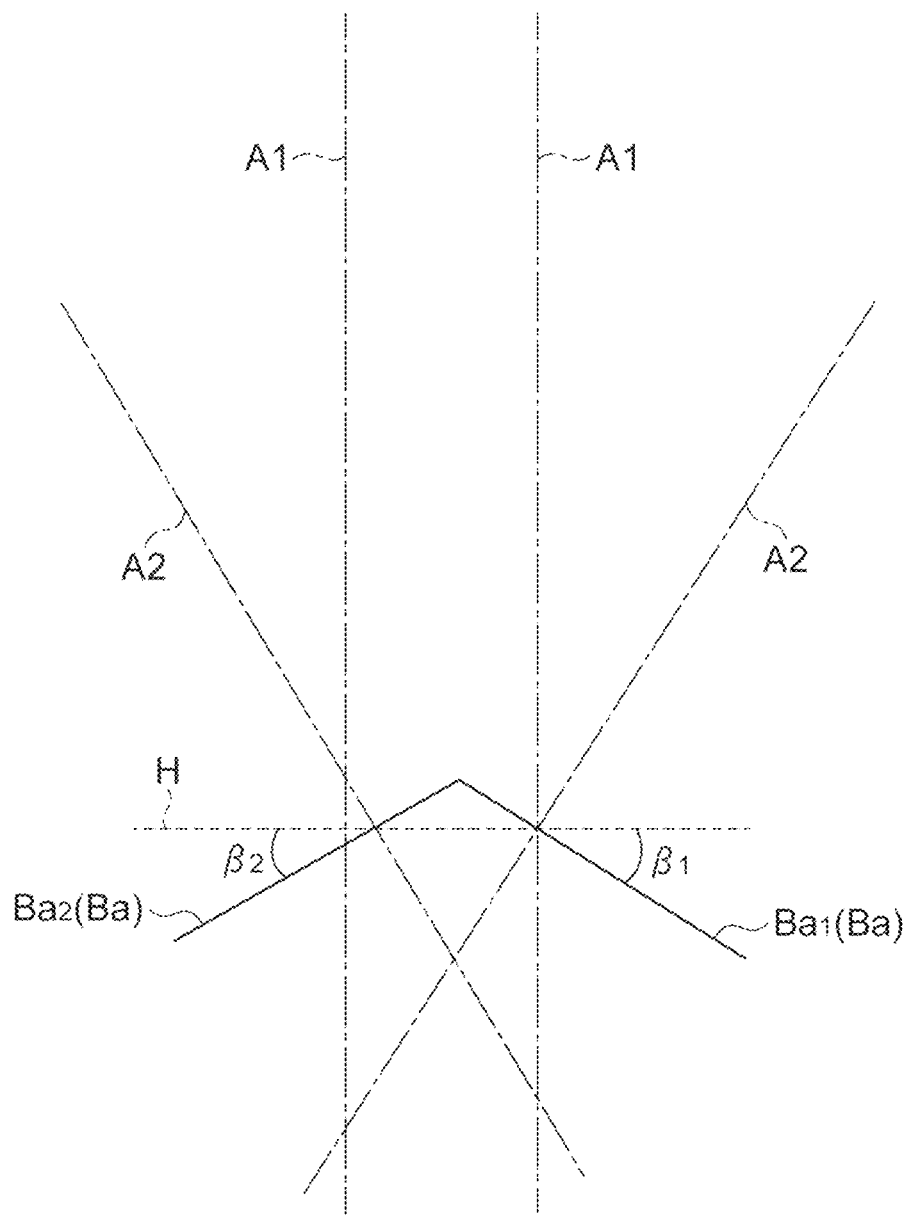
FIG. 10 is a diagram illustrating a case where it can be approximated that the refractive index interface of the object is constituted by two faces.
Figure 11:
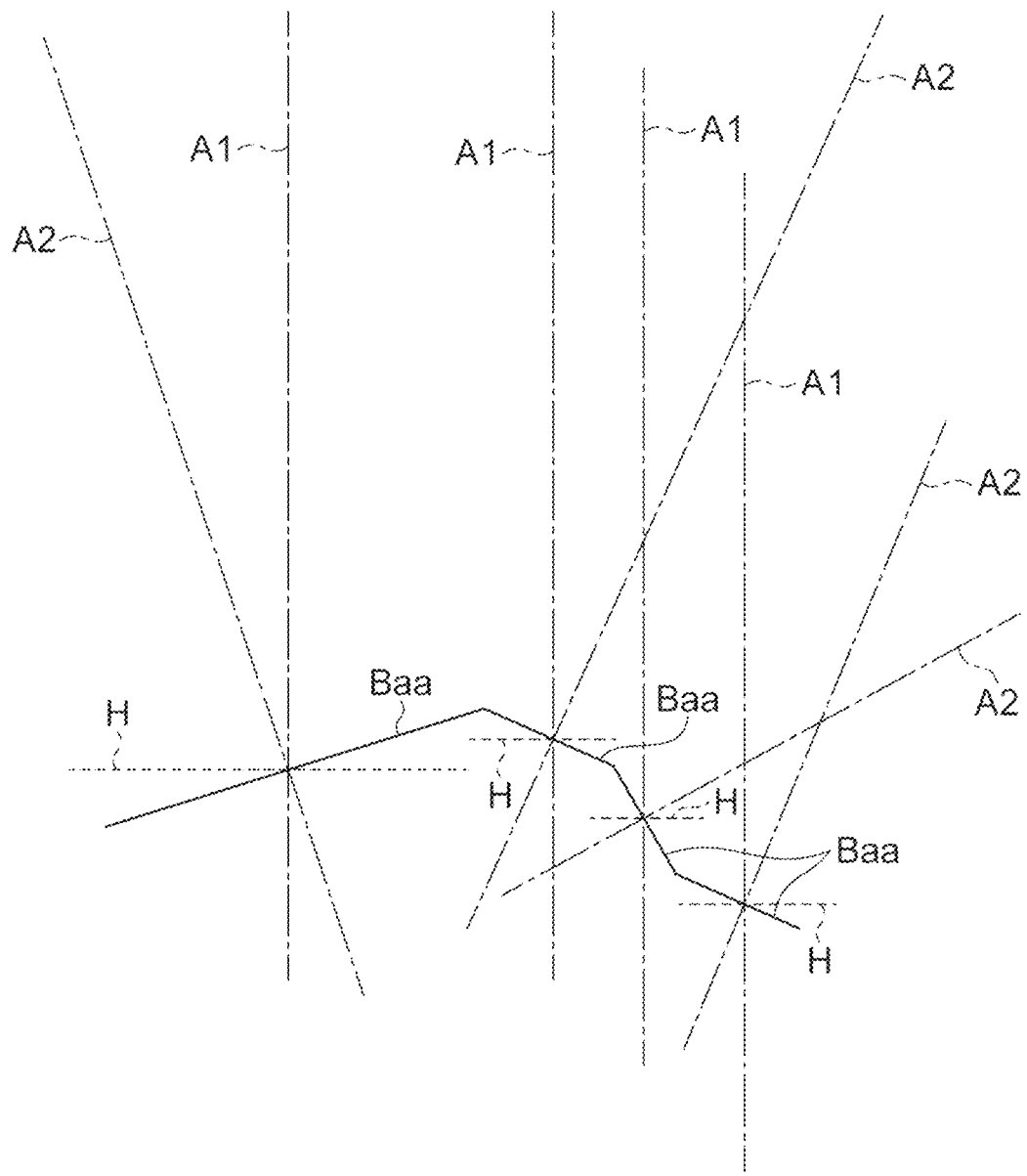
FIG. 11 is a diagram illustrating a case where it can be approximated that the refractive index interface of the object is constituted by a large number of faces.

As illustrated in FIG. 10, for example, when it can be approximated that the surface Ba of the object B is constituted by two faces Ba1, Ba2, an inclination azimuth angle $\alpha_1$ and an inclination angle $\beta_1$ for the face Ba1 and an inclination azimuth angle $\alpha_2$ and an inclination angle $\beta_2$ for the face Ba2 can be respectively measured. Further, in the determination step S12a, a moving direction and a moving distance of a partial correction pattern for correcting aberration caused by the face Ba1 is calculated on the basis of the inclination azimuth angle $\alpha_1$ and the inclination angle $\beta_1$. Similarly, in the determination step S12a, a moving direction and a moving distance of a partial correction pattern for correcting aberration caused by the face Ba2 is calculated on the basis of the inclination azimuth angle $\alpha_2$ and the inclination angle $\beta_2$. Further, a modulation pattern for aberration correction can be created by superimposing the moved partial correction patterns on each other. The same applies to the case where it can be approximated that the surface Ba of the object B is constituted by a large number of faces Baa, for example, as illustrated in FIG. 11.

According to the present modification, even when the surface Ba of the object B has a complicated shape in which the inclination angle β differs between regions, it is possible to easily perform aberration correction within a short time without performing a complicated calculation in a manner similar to the above embodiment.

Third Modification

Figure 12:
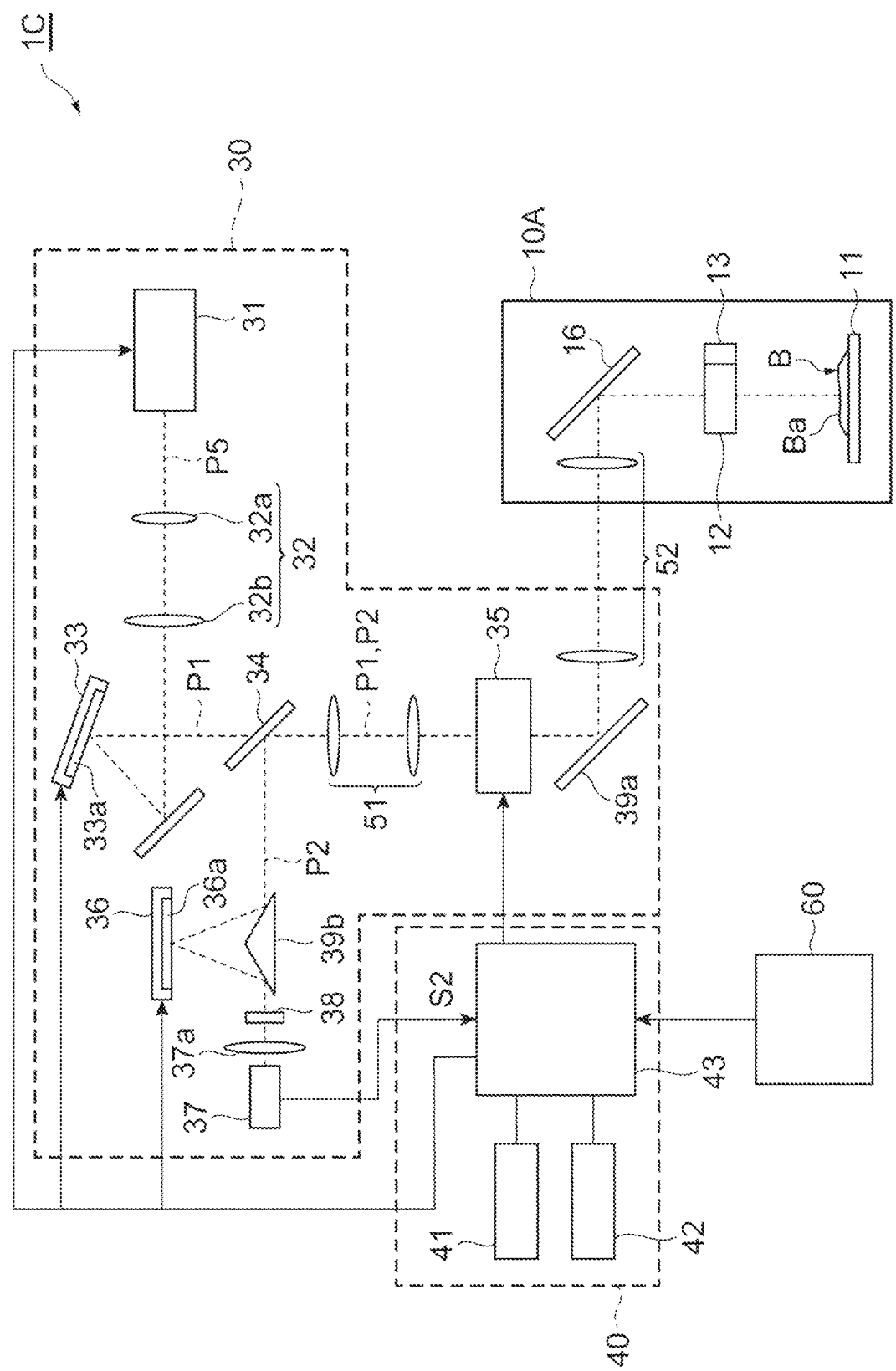
FIG. 12 is a diagram illustrating a configuration of a microscope apparatus according to a third modification.

FIG. 12 is a diagram illustrating a configuration of a microscope apparatus 1C according to a third modification of the above embodiment. The microscope apparatus 1C differs from the microscope apparatus 1A illustrated in FIG.

1 in that the apparatus includes a shape memory unit 60 instead of the inclination measurement unit 20.

The shape memory unit 60 is a storage unit in the present embodiment and stores information relating to the inclination angle β of the surface Ba of the object B in advance. Further, in the determination step S12a illustrated in FIG. 2, the computer 43 determines the moving distance of the correction pattern D3 on the basis of the information stored in the shape memory unit 60. According to the aberration correction method and the microscope apparatus 1C as described above, it is possible to eliminate the measurement step S11 illustrated in FIG. 2 to further reduce the operating time. In particular, for example, it is suitable for the case where the inclination azimuth angle α and the inclination angle β of the surface Ba is known as with a semiconductor device.

In addition, the microscope apparatus 1C of the present modification does not require the inclination measurement unit 20, and thus, a microscope unit 10A does not include the reflective mirror 15 (refer to FIG. 1) and includes a reflective mirror 16 instead of the beam splitter 14 (refer to FIG. 1). The other configuration of the microscope unit 10A is similar to the configuration of the microscope unit 10 of the above embodiment.

Fourth Modification

In the above embodiment, the inclination measurement unit 20 measures the surface shape of the object B using a Michelson interferometer. There are various methods other than the above method as a method for measuring the inclination azimuth angle α and the inclination angle β of the surface Ba of the object B. For example, the surface shape of the object B can be measured from the outlines of the object B included in a plurality of images having different depths which are obtained by pre-scan. Further, the surface shape of the object B can be measured by applying ultrasonic waves to the surface Ba of the object B and measuring reflected waves thereof. Further, a light-section method can also be used.

(a) in FIG. 13 and (b) in FIG. 13 are mouse brain images obtained by pre-scan. (a) in FIG. 13 is an image at a depth position of 120 μm from the top of the object B in the optical axis direction, and (b) in FIG. 13 is an image at a depth position of 560 μm from the top of the object B in the optical axis direction. As illustrated in these figures, an outline Bc of the object B (the boundary between the object B and the surrounding medium) by autofluorescence clearly appears in the images. The inclination azimuth angle α and the inclination angle β of the surface Ba can be appropriately obtained on the basis of the depth positions of these images and a change in the outline Bc.

Fifth Modification

Figure 14:
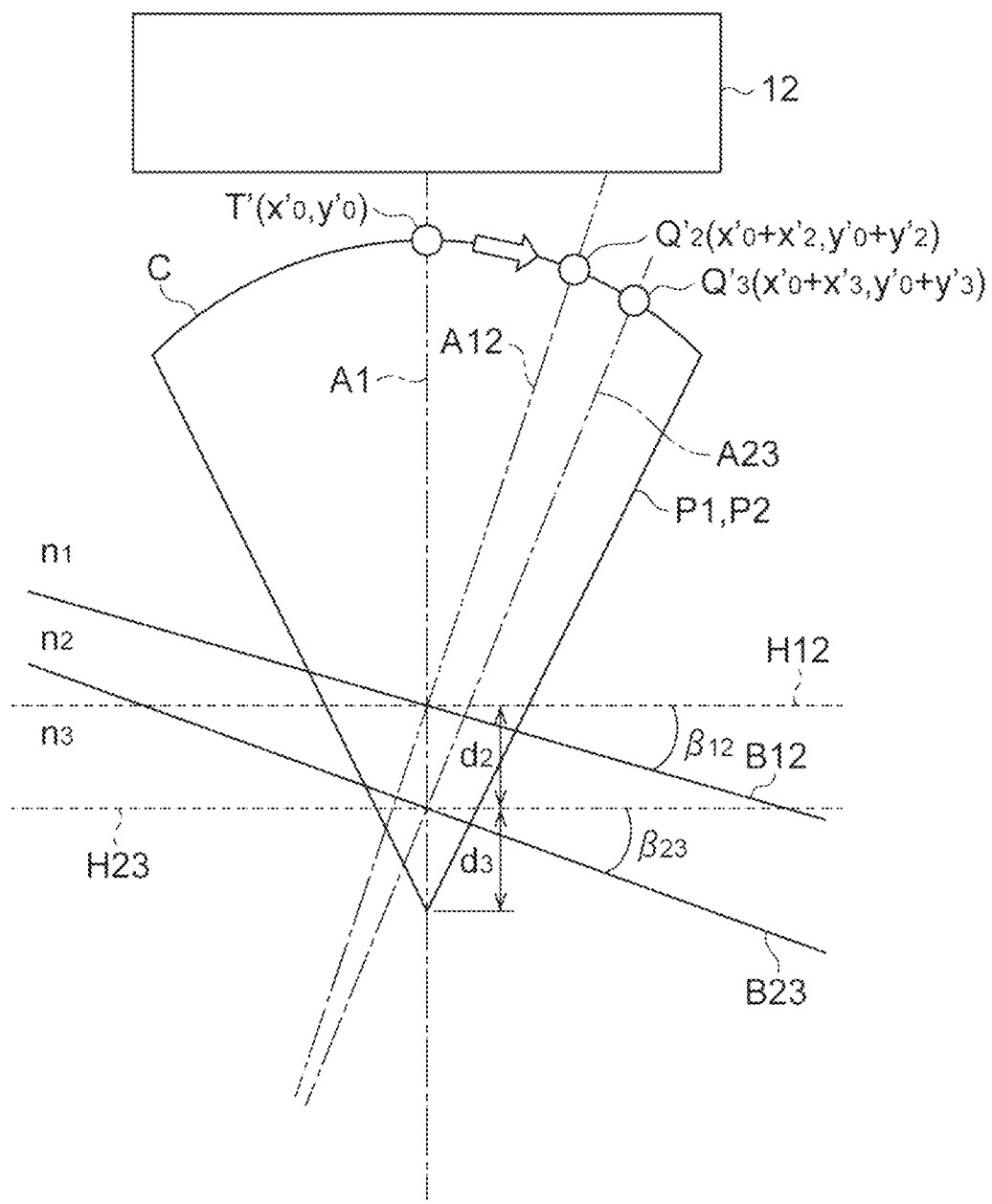
FIG. 14 is a diagram illustrating a state when the object includes a plurality of refractive index interfaces inside thereof.

In the above embodiment, it is assumed that the object B includes a single refractive index interface. However, the object B may include a plurality of refractive index interfaces. FIG. 14 is a diagram illustrating a state in which the object B includes a plurality of refractive index interfaces B12, B23 inside thereof. In addition, the refractive index interface B12 is inclined by an angle $β_{12}$ with respect to a plane H12 which is perpendicular to the optical axis A1 of the objective lens 12, and the refractive index interface B23 is inclined by an angle $β_{23}$ with respect to a plane H23 which is perpendicular to the optical axis A1 of the objective lens 12.

In this case, a straight line perpendicular to the refractive index interface B12 serves as a new optical axis A12, and an intersection point Q'$_2$ (x'$_0$+x'$_2$, y'$_0$+y'$_2$) between the optical axis A12 and a wavefront (paraboloid) C of the light P1 output from the objective lens 12 (or the light P2 incident on the objective lens 12) is obtained. Similarly, a straight line perpendicular to the refractive index interface B23 serves as a new optical axis A23, and an intersection point Q'$_3$ (x'$_0$+x'$_3$, y'$_0$+y'$_3$) between the optical axis A23 and the wavefront C is obtained.

Further, an aberration correction pattern φ when the refractive index interfaces B12 and B23 are inclined is obtained by the following formula (12). Even when the object B includes the plurality of refractive index interfaces B12, B23 inside thereof, aberration correction can be performed using a single spatial light modulator by using the aberration correction pattern φ obtained by the formula (12). Further, when a plurality of spatial light modulators are used, an aberration correction pattern φ taking into consideration the inclination of each of the refractive index interfaces B12, B23 may be obtained to control each of the spatial light modulators.

[Formula 3]

$$\overline{NA}\rho_2(x, y) = p * \sqrt{(x - (x_0 + x_2))^2 + (y - (y_0 + y_2))^2} \quad (12)$$

$$\overline{NA}\rho_3(x, y) = p * \sqrt{(x - (x_0 + x_3))^2 + (y - (y_0 + y_3))^2}$$

$$\Phi(r) = -\frac{2\pi}{\lambda}\left\{d_2\cos\beta_{12}\left(\alpha_1\sqrt{n_2^2 - (\overline{NA}\rho_1)^2} - \sqrt{n_1^2 - (\overline{NA}\rho_1)^2}\right) + d_3\cos\beta_{23}\left(\alpha_2\sqrt{n_3^2 - (\overline{NA}\rho_1)^2} - \sqrt{n_1^2 - (\overline{NA}\rho_1)^2}\right)\right\}$$

Here, $d_2$ denotes the distance between the refractive index interface B12 and the refractive index interface B23 on the optical axis A1, $d_3$ denotes the distance between the refractive index interface B23 and the focusing point on the optical axis, $n_1$ denotes the refractive index of a part located on the objective lens 12 side relative to the refractive index interface B12, $n_2$ denotes the refractive index of a part between the refractive index interface B12 and the refractive index interface B23 of the object B, and $n_3$ denotes the refractive index of a part located at the side opposite to the objective lens 12 relative to the refractive index interface B23. $x_2$ and $y_2$ can be obtained from the inclination of the refractive index interface B12, and $x_3$ and $y_3$ can be obtained from the inclination of the refractive index interface B23.

The aberration correction method and the optical apparatus are not limited to the above embodiments and can be variously modified. For example, the embodiments and the modifications described above may be combined with each other according to a required object and effect. For example, the third modification is described as a modification of the embodiment illustrated in FIG. 1 and FIG. 2, however, also in the first modification, the shape memory unit 60 may be provided instead of the inclination measurement unit 20 illustrated in FIG. 9, and the computer 43 may determine the moving distance of the modulation planes 33a, 36a on the basis of information stored in the shape memory unit 60 in the determination step S21 illustrated in FIG. 8. Further, a memory unit (storage unit) that stores a correction pattern may be provided instead of the shape memory unit 60. Further, the memory unit may expand the correction pattern to a polynomial such as a Zernike polynomial and store coefficients of respective terms of the polynomial.

Further, in the embodiments and the modifications described above, the modulation pattern displayed on the SLM may not be the correction pattern itself. For example, the modulation pattern may be a modulation pattern in which another pattern such as a pattern for controlling the focusing shape and the focusing position of the irradiation light P1 for irradiating the object B and the correction pattern are superimposed on each other. Further, although, in the embodiments and the modifications described above, the microscope apparatus is described as an example of the optical apparatus, the aberration correction method is applicable to various optical apparatuses, for example, such as a laser processing apparatus.

Further, the inclination measurement unit 20 may be a measurement unit that performs measurement by a light-section method using a line laser and a camera in combination or may be a measurement unit that measures a focusing position by moving the object B in the optical axis direction of the objective lens 12. Further, two or more detectors may be incorporated in the optical system.

Further, the microscope apparatuses 1A, 1B, and 1C have a configuration of an upright microscope, however, the microscope apparatuses are not limited thereto, and may have a configuration of an inverted microscope. In the case of the inverted microscope, the object B is pressed with a glass surface serving as a reference plane, and a part that cannot be pressed and cannot become flat can be measured by the measurement unit 20.

Further, in the microscope apparatuses 1A, 1B, and 1C, the detection target light P2 is descanned by the optical scanner 35 and detected by the detector 37, however, it is not limited thereto, and the detection target light P2 may be detected by the detector 37 without being descanned by the optical scanner 35. Further, the inclination information may be the inclination angle itself.

The aberration correction method of the above embodiment is configured to include a coupling step of optically coupling a modulation plane of a spatial light modulator and an object through an objective lens; and a control step of controlling the spatial light modulator on the basis of a modulation pattern including a correction pattern for correcting aberration caused by a refractive index interface of the object. In the aberration correction method, a position of the correction pattern in the modulation pattern is set on the basis of inclination information of the refractive index interface of the object with respect to a plane perpendicular to an optical axis of the objective lens.

Further, the optical apparatus of the above embodiment is configured to include a spatial light modulator having a modulation plane; an objective lens disposed on an optical path between the modulation plane and an object; and a control unit for controlling the spatial light modulator on the basis of a modulation pattern including a correction pattern for correcting aberration caused by a refractive index interface of the object. In the optical apparatus, a position of the correction pattern in the modulation pattern is set on the basis of inclination information of the refractive index interface of the object with respect to a plane perpendicular to an optical axis of the objective lens.

The aberration correction method of the above embodiment is configured to include a coupling step of optically coupling a modulation plane of a spatial light modulator and an object through an objective lens; and a control step of controlling the spatial light modulator on the basis of a modulation pattern including a correction pattern for correcting aberration caused by a refractive index interface of the object. In the aberration correction method, the spatial light modulator and the objective lens are disposed on the basis of inclination information of the refractive index interface of the object with respect to a plane perpendicular to an optical axis of the objective lens.

Further, the optical apparatus of the above embodiment is configured to include a spatial light modulator having a modulation plane, and for modulating light on the basis of a modulation pattern including a correction pattern for correcting aberration caused by a refractive index interface of an object; an objective lens disposed on an optical path between the modulation plane and the object; a moving mechanism for moving at least one of the objective lens and the spatial light modulator in a direction intersecting with an optical axis of the objective lens; and a control unit for controlling the moving mechanism. In the optical apparatus, the control unit controls the moving mechanism on the basis of inclination information of the refractive index interface of the object with respect to a plane perpendicular to the optical axis of the objective lens.

Further, the above aberration correction method may further include a measurement step of measuring an inclination angle of the refractive index interface of the object, and the inclination information may be determined on the basis of the inclination angle measured by the measurement step. Similarly, the above optical apparatus may further include a measurement unit for measuring an inclination angle of the refractive index interface of the object, and the inclination information may be determined on the basis of the inclination angle measured by the measurement unit. Accordingly, it is possible to measure the inclination angle and appropriately determine the moving distance of the correction pattern.

In this case, the measurement step of the aberration correction method may include acquiring a plurality of images of the object having different depths from the refractive index interface of the object, and obtaining the inclination angle on the basis of the plurality of images. Similarly, the measurement unit of the optical apparatus may acquire a plurality of images of the object having different depths from the refractive index interface of the object, and obtain the inclination angle on the basis of the plurality of images. Accordingly, it is possible to easily measure the inclination angle.

Further, in the above aberration correction method, the inclination information may be determined on the basis of information relating to an inclination angle of the refractive index interface of the object stored in advance. Similarly, the above optical apparatus may further include a storage unit for storing information relating to an inclination angle of the refractive index interface of the object in advance, and the inclination information may be determined on the basis of the information stored in the storage unit. Accordingly, it is possible to further reduce the operating time.

Further, in the above aberration correction method and the optical apparatus, a diameter of a region of the correction pattern on the modulation plane may be larger than a pupil diameter of the objective lens. When the correction pattern (or the modulation plane) is moved relative to the optical axis, a region where the correction pattern is present is deviated with respect to the optical axis. Thus, when the region of the correction pattern is small, there is a possibility that part of light does not pass through the correction pattern, and aberration correction is not performed. When the diameter of the region of the correction pattern is larger than the pupil diameter of the objective lens, such a possibility can be reduced.

Further, in the above aberration correction method, the measurement step may include dividing the refractive index interface of the object into a plurality of regions, and measuring the inclination angles in the respective regions, and the inclination information may be determined on the basis of the inclination angles in the respective regions. Similarly, the measurement unit of the above optical apparatus may divide the refractive index interface of the object into a plurality of regions, and measure the inclination angles in the respective regions, and the inclination information may be determined on the basis of the inclination angles in the respective regions. Accordingly, even when the refractive index interface of the object has a complicated shape in which the inclination angle differs between regions, it is possible to appropriately obtain actions and effects of the aberration correction method and the optical apparatus described above.

INDUSTRIAL APPLICABILITY

The embodiments can be used as an aberration correction method and an optical apparatus.

REFERENCE SIGNS LIST 1A, 1B, 1C-microscope apparatus, 10, 10A-microscope unit, 11-sample stage, 12-objective lens, 12a-optical axis, 13-objective lens moving mechanism, 14-beam splitter, 15, 16-reflective mirror, 20-inclination measurement unit, 21-coherent light source, 22-beam splitter, 23-reference light mirror, 24-detector, 30-image acquisition unit, 31-laser light source, 32-beam expander, 33,36-SLM, 33a, 36a-modulation plane, 33b, 36b-moving mechanism, 34-dichroic mirror, 35-optical scanner, 37-detector, 37a-focusing lens, 38-filter, 39a-mirror, 39b-reflective member, 40-control unit, 41-input device, 42-display device, 43-computer, 51-4f optical system, 60-shape memory unit, A1, A2-optical axis, B-object, Ba-surface, Bc-outline, D1, D2-modulation pattern, D3-aberration correction pattern, H-plane, P1-irradiation light, P2-detection target light, P3-coherent light, P4-interference light, P5-light, O-center of correction pattern.

The invention claimed is:

1. An aberration correction method comprising:
   a coupling step of optically coupling a modulation plane of a spatial light modulator and an object through an objective lens;
   a control step of controlling the spatial light modulator on the basis of a modulation pattern including a correction pattern for correcting aberration caused by a refractive index interface of the object; and
   a measurement step of measuring an inclination angle of the refractive index interface of the object, wherein
   a position of the correction pattern in the modulation pattern is set on the basis of inclination information of the refractive index interface of the object with respect to a plane perpendicular to an optical axis of the objective lens such that a center of the correction pattern is deviated from a point where the optical axis of the objective lens intersects with the modulation plane by a distance determined on the basis of the inclination information, and
   the inclination information is determined on the basis of the inclination angle measured by the measurement step.

2. The aberration correction method according to claim 1, wherein the measurement step includes acquiring a plurality of images of the object having different depths from the refractive index interface of the object, and obtaining the inclination angle on the basis of the plurality of images.

3. The aberration correction method according to claim 1, wherein a diameter of a region of the correction pattern on the modulation plane is larger than a pupil diameter of the objective lens.

4. The aberration correction method according to claim 1, wherein the measurement step includes dividing the refractive index interface of the object into a plurality of regions, and measuring the inclination angles in the respective regions, and
   the inclination information is determined on the basis of the inclination angles in the respective regions.

5. An aberration correction method comprising:
   a coupling step of optically coupling a modulation plane of a spatial light modulator and an object through an objective lens;
   a control step of controlling the spatial light modulator on the basis of a modulation pattern including a correction pattern for correcting aberration caused by a refractive index interface of the object; and
   a measurement step of measuring an inclination angle of the refractive index interface of the object, wherein
   the spatial light modulator and the objective lens are disposed on the basis of inclination information of the refractive index interface of the object with respect to a plane perpendicular to an optical axis of the objective lens such that the modulation plane is deviated relative to the optical axis of the objective lens in a direction intersecting with the optical axis by a distance determined on the basis of the inclination information, and
   the inclination information is determined on the basis of the inclination angle measured by the measurement step.

6. The aberration correction method according to claim 5, wherein the measurement step includes acquiring a plurality of images of the object having different depths from the refractive index interface of the object, and obtaining the inclination angle on the basis of the plurality of images.

7. The aberration correction method according to claim 2, wherein a diameter of a region of the correction pattern on the modulation plane is larger than a pupil diameter of the objective lens.

8. The aberration correction method according to claim 5, wherein the measurement step includes dividing the refractive index interface of the object into a plurality of regions, and measuring the inclination angles in the respective regions, and
   the inclination information is determined on the basis of the inclination angles in the respective regions.

9. An optical apparatus comprising:
   a spatial light modulator having a modulation plane;
   an objective lens disposed on an optical path between the modulation plane and an object;
   a controller configured to control the spatial light modulator on the basis of a modulation pattern including a correction pattern for correcting aberration caused by a refractive index interface of the object; and
   a measurement unit configured to measure an inclination angle of the refractive index interface of the object, wherein
   a position of the correction pattern in the modulation pattern is set on the basis of inclination information of the refractive index interface of the object with respect to a plane perpendicular to an optical axis of the objective lens such that a center of the correction pattern is deviated from a point where the optical axis of the objective lens intersects with the modulation plane by a distance determined on the basis of the inclination information, and the inclination information is determined on the basis of the inclination angle measured by the measurement unit.

10. The optical apparatus according to claim 9, wherein the measurement unit is configured to acquire a plurality of images of the object having different depths from the refractive index interface of the object, and obtain the inclination angle on the basis of the plurality of images.

11. The optical apparatus according to claim 9, wherein a diameter of a region of the correction pattern on the modulation plane is larger than a pupil diameter of the objective lens.

12. The optical apparatus according to claim 9, wherein the measurement unit is configured to divide the refractive index interface of the object into a plurality of regions, and measure the inclination angles in the respective regions, and the inclination information is determined on the basis of the inclination angles in the respective regions.

13. An optical apparatus comprising:

a spatial light modulator having a modulation plane, and configured to modulate light on the basis of a modulation pattern including a correction pattern for correcting aberration caused by a refractive index interface of an object;

an objective lens disposed on an optical path between the modulation plane and the object;

a moving mechanism configured to move at least one of the objective lens and the spatial light modulator in a direction intersecting with an optical axis of the objective lens;

a controller configured to control the moving mechanism; and a measurement unit configured to measure an inclination angle of the refractive index interface of the object, wherein the controller is configured to control the moving mechanism on the basis of inclination information of the refractive index interface of the object with respect to a plane perpendicular to the optical axis of the objective lens such that the modulation plane is deviated relative to the optical axis of the objective lens in a direction intersecting with the optical axis by a distance determined on the basis of the inclination information, and the inclination information is determined on the basis of the inclination angle measured by the measurement unit.

14. The optical apparatus according to claim 13, wherein the measurement unit is configured to acquire a plurality of images of the object having different depths from the refractive index interface of the object, and obtain the inclination angle on the basis of the plurality of images.

15. The optical apparatus according to claim 13, wherein a diameter of a region of the correction pattern on the modulation plane is larger than a pupil diameter of the objective lens.

16. The optical apparatus according to claim 13, wherein the measurement unit is configured to divide the refractive index interface of the object into a plurality of regions, and measure the inclination angles in the respective regions, and the inclination information is determined on the basis of the inclination angles in the respective regions.

* * * * *